United States Patent [19]

Salminen

[11] Patent Number: 5,482,594
[45] Date of Patent: Jan. 9, 1996

[54] LIQUID REMOVAL APPARATUS AND METHOD FOR WOOD PULP

[76] Inventor: Reijo Salminen, 373 Cove Rd., Bellingham, Whatcom County, Wash. 98226

[21] Appl. No.: 898,944

[22] Filed: Jun. 11, 1992

Related U.S. Application Data

[63] Continuation-in-part of Ser. No. 748,271, Aug. 21, 1991, abandoned.

[51] Int. Cl.[6] ..................................................... D21C 9/02
[52] U.S. Cl. ........................... 162/60; 162/56; 162/297; 210/406; 210/400
[58] Field of Search ................................ 210/406, 808, 210/401, 400, 402, 768, 398, 227; 68/9, 2, 5 R, 158; 162/297, 315, 218, 189, 388, 363, 382, 374, 291, 305, 60–62, 308, 56; 134/68, 72

[56] References Cited

U.S. PATENT DOCUMENTS

| | | | |
|---|---|---|---|
| 3,922,298 | 11/1976 | Davis | 210/401 |
| 3,970,552 | 7/1976 | Bongert | 210/406 |
| 4,154,644 | 5/1979 | Ericsson | 162/351 |
| 4,233,157 | 11/1980 | Miller | 210/406 |
| 4,477,358 | 10/1984 | Heintges et al. | 210/401 |
| 4,956,088 | 9/1990 | Hindstrom | 210/406 |
| 5,209,841 | 5/1993 | Bratten | 210/400 |

*Primary Examiner*—Brenda Adele Lamb
*Attorney, Agent, or Firm*—Robert B. Hughes; Hughes, Multer & Schacht

[57] ABSTRACT

A pulp dewatering and washing apparatus comprising a pressure vessel in which is contained a table assembly having a foraminous surface, in the form of a conveying belt, on which a pulp slurry is deposited. A differential pressure chamber in the table assembly is vented to a lower pressure location to cause a pressure differential across the pulp slurry to cause dewatering. Also, wash water is deposited on the dewatered pulp in sequential cycles to accomplish washing. A contact plate is provided to press the pulp slurry to aid in dewatering. The conveying belt of the table assembly on which the pulp slurry is deposited is stationary during the dewatering and washing, and then after the pressure differential between the vessel and the pressure differential chamber is reduced to zero, the conveyor belt moves the dewatered and washed slurry to a discharge location.

103 Claims, 19 Drawing Sheets

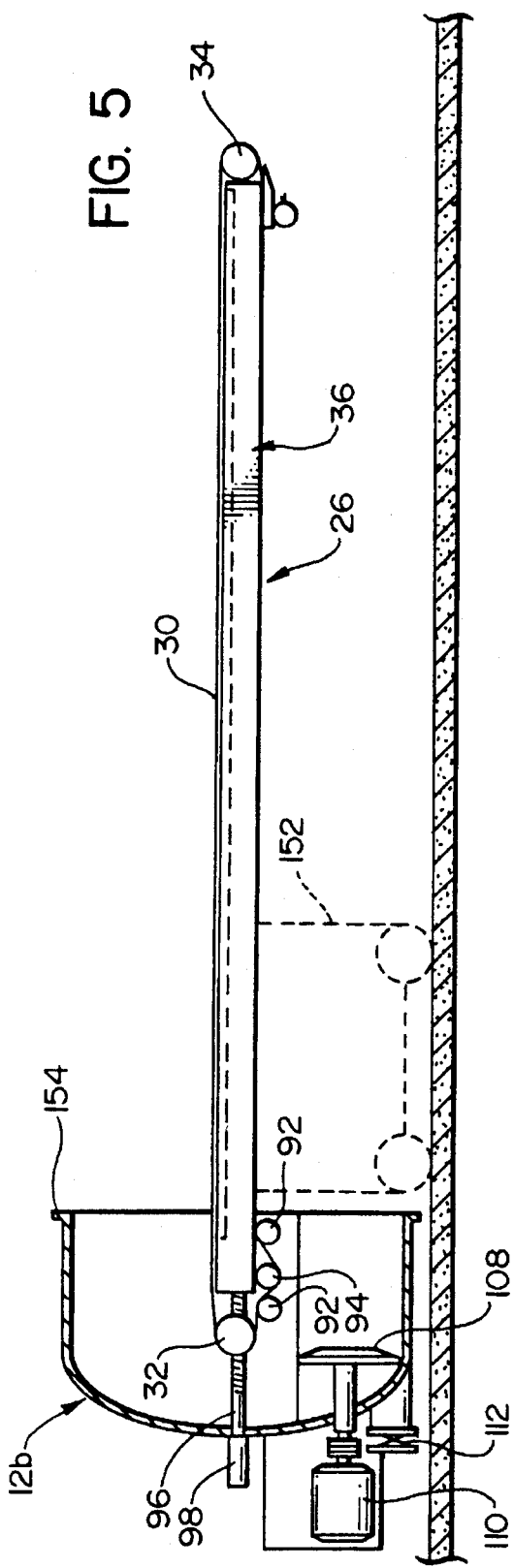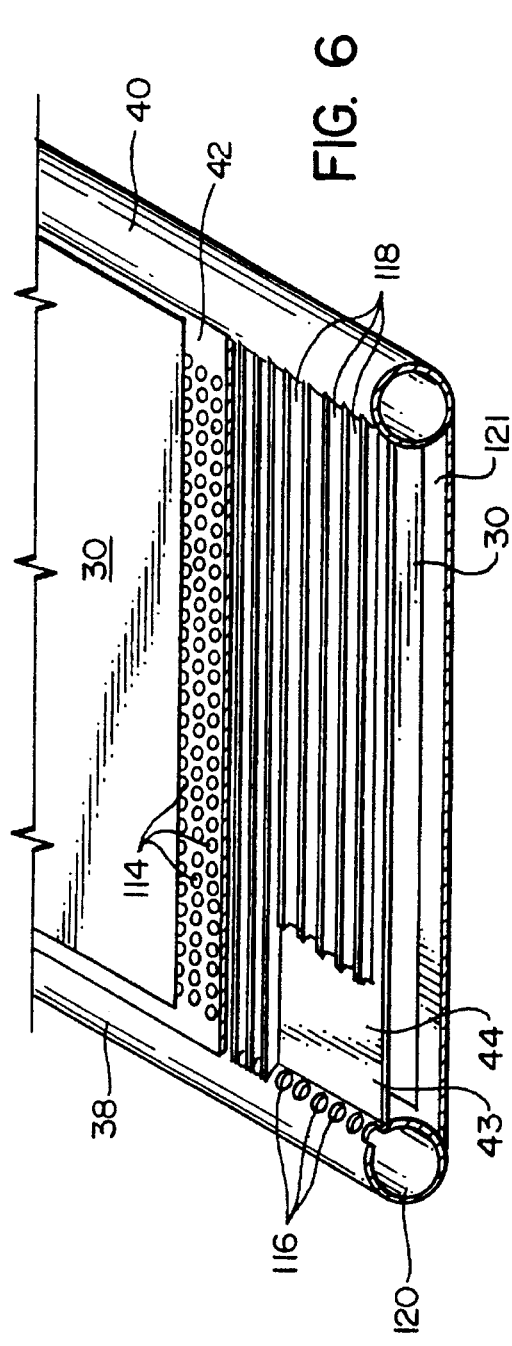

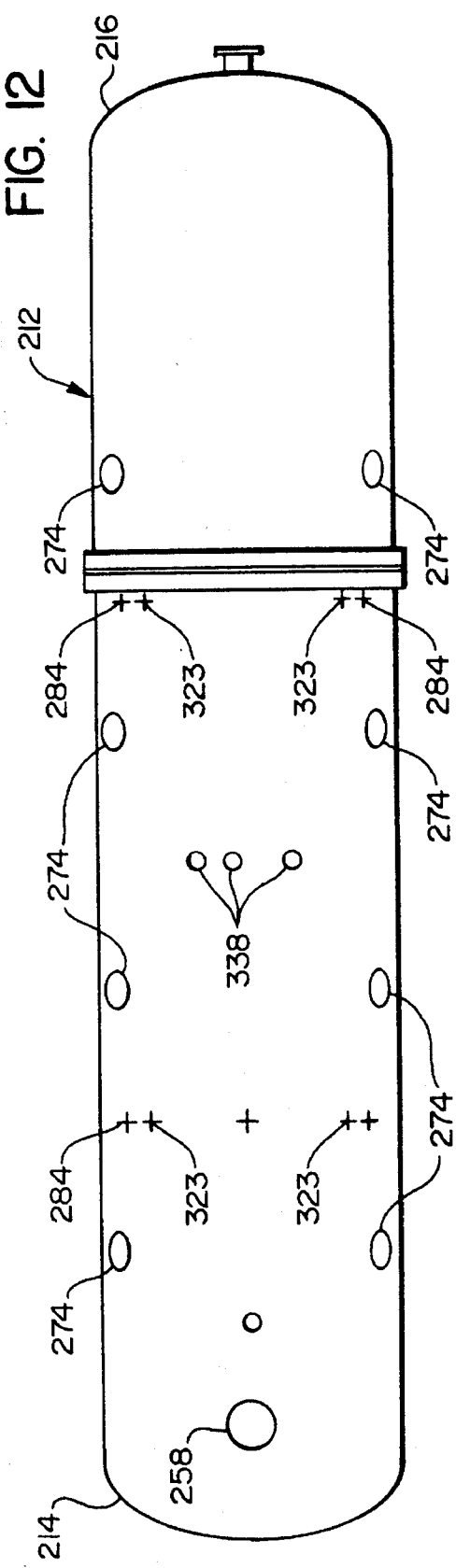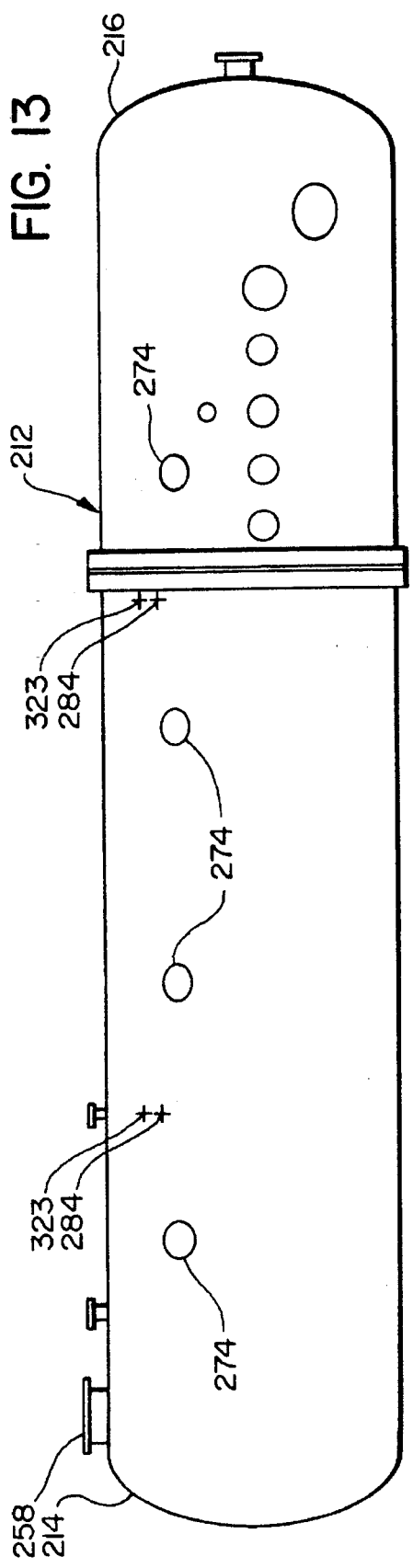

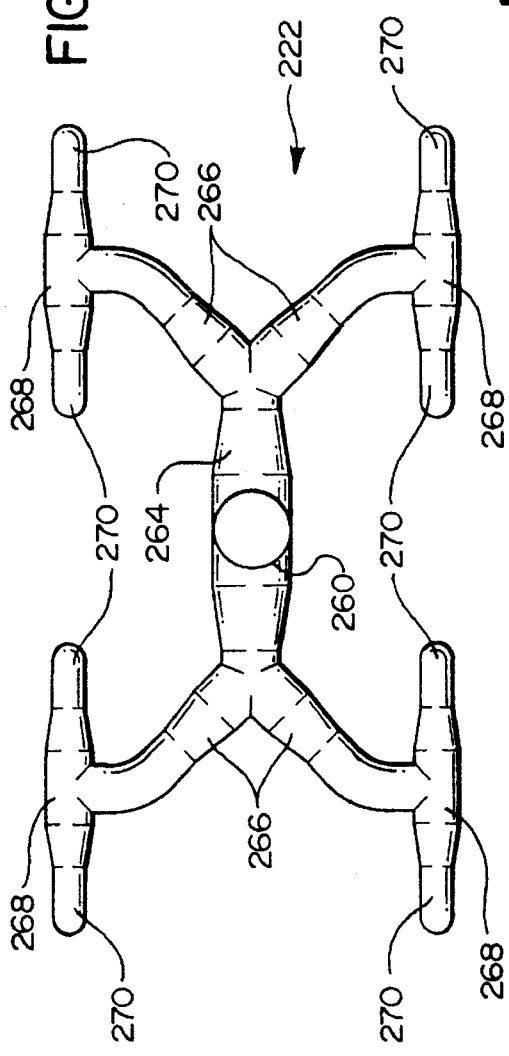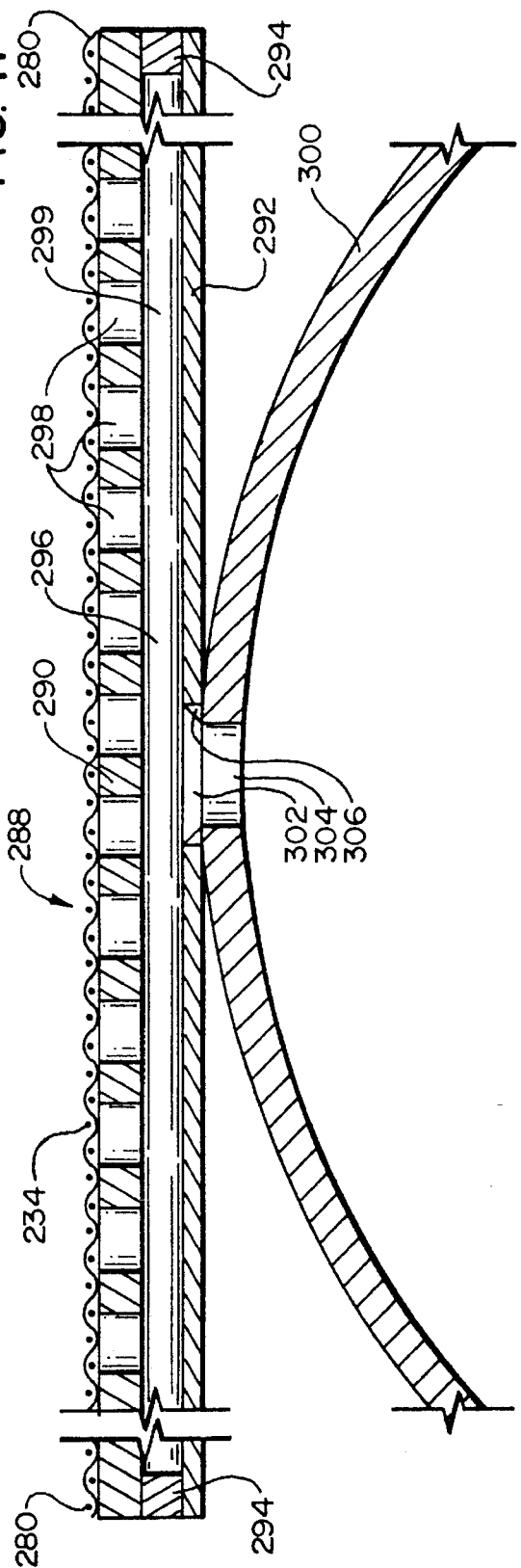

5,482,594

LIQUID REMOVAL APPARATUS AND METHOD FOR WOOD PULP

CROSS REFERENCE TO A RELATED PATENT APPLICATION

This is a continuation-in-part of Ser. No. 07/748,271, filed Aug. 21, 1991, now abandoned entitled "LIQUID REMOVAL APPARATUS AND METHOD FOR WOOD PULP OR THE LIKE".

BACKGROUND OF THE INVENTION a. Field of the Invention

The present invention relates to an apparatus and method for liquid removal for wood pulp, and more particularly to such an apparatus and method which is particularly adapted for dewatering and/or washing material such as wood pulp or the like, and in a preferred form, both dewatering and washing.

b. Background Art in the pulp and paper industry, there are in general three common methods of accomplishing a dewatering and/or washing operation. One method is to employ a rotating drum which has a perforate cylindrical sidewall, where the cylindrical sidewall on one side travels downwardly into a bath of a pulp slurry and then Travels upwardly to a location above the pulp slurry bath. A suction is applied within the drum, so that a portion of the pulp slurry adheres to the surface of the drum. As the layer of wood pulp on the drum is carried upwardly above the pulp slurry bath, in a first path of travel a dewatering operation is accomplished where the water from the pulp slurry is drawn into the interior of the drum. Then in a second part of the travel of the pulp on the drum, a wash water is deposited on the pulp mat that has been dewatered to cause displacement washing to be accomplished. Before the layer of pulp material that has been dewatered and washed travels back into the pulp bath, this layer is removed from the drum by a doctor blade or the like. The drum is sometimes enclosed in a pressure chamber, and for practical reasons, the pressure differential used in the drum-type dewatering/washing operation is in the range of about four to ten pounds per square inch.

A second method is to use a continuously moving foraminous conveyor belt onto which a wood pulp slurry is deposited. The conveyor belt carries the wood pulp slurry sequentially over a series of suction boxes which create a lower than atmospheric pressure below the belt to apply a differential pressure across the moving conveying belt to perform first a dewatering operation, and then a washing operation where wash water is deposited on the layer of wood pulp. In this type of operation, the pressure differential that can be applied across the pulp layer is limited because of the frictional force created between the moving belt and its underlying support structure, and the pressure differential limitations in such devices are generally in the range of about two to three pounds per square inch.

A third type of dewatering/washing operation is to move the pulp between upper and lower foraminous belts which are pushed toward one another to squeeze the water from the pulp. Then the pulp is mixed with a cleaning liquid, and the liquid removal operation is again repeated by again squeezing the pulp. This series of steps is continued until the desired dewatering and washing is accomplished.

To the best knowledge of the applicant, all of the dewatering/washing systems that have actually been used commercially operate with pressure differentials in the range of two to ten pounds per square inch, but no higher. As will be discussed later herein, the pressure differentials in the present invention are substantially higher, even up to three hundred PSI or higher.

SUMMARY OF THE INVENTION

The present invention comprises an apparatus to accomplish liquid removal from a pulp slurry where a slurry is moved into an above atmospheric pressure chamber and deposited as a layer over a processing area. A pressure differential is imposed at said layer while said layer is stationary at said processing area to remove liquid therefrom. Then the pressure differential is reduced (preferably to zero) and the layer is removed from the processing area. The apparatus comprises a pressure vessel defining the pressure chamber. There is means to pressurize the pressure chamber to an above atmospheric pressure level. Input means are provided to supply pressurized pulp slurry into the pressure chamber and deposit the pulp slurry as said layer at the processing area.

There is a table assembly which has a perforate support surface means for receiving the pulp slurry thereon, and which is arranged to contain the pulp slurry in the processing area that is located over the support surface. The support surface means is arranged to be exposed to pressure in said pressure chamber.

There is infeed means to direct a portion of the pulp slurry under pressure into the chamber and onto the surface as a layer, with the containment means containing the layer in the processing area at a stationary location relative to the support surface. The table assembly defines a pressure differential table below the support surface.

There is pressure differential means to selectively create a pressure differential between the pressure differential chamber and the pressure chamber defined by the vessel, while maintaining the pressure in the vessel. This is done with the pulp slurry on the surface means to cause liquid to flow from the pulp slurry to the pressure differential chamber. The pressure differential means is also adapted to selectively reduce the pressure differential.

Removal means are provided to remove the pulp slurry after liquid removal therefrom, and after the pressure differential is reduced, while continuing to maintain the pressure in the pressure chamber.

Desirably, the pressure chamber extends both above and below said table assembly, and more desirably, the entire table assembly is positioned within said pressure chamber. Also, the table assembly has containment means around the processing area.

In the preferred form, the table assembly comprises a table unit having upper and lower plate means defining the pressure differential chamber. Further, the table assembly comprises compression load means positioned between the upper and lower plate means to resist compression loads from pressure in the pressure chamber. The compression load means in the preferred form subdivides the differential pressure chamber into subchambers.

More specifically, the containment means comprises a frame means extending around the processing area to contain the pulp slurry in the processing area. Further, in the preferred form at least a portion of the frame enclosure means is moveable between a first position adjacent to the perforate support surface means so as to contain the layer, and a second position where at least a portion of the frame enclosure means is spaced away from the support surface means. The assembly further comprises a frame actuating means to move the frame enclosure means between said first and second positions.

Further, in the preferred form, the support surface means and the removal means comprises a foraminous conveying belt assembly which comprises a conveying belt means and power means to move the belt relative to the processing area.

Another feature of the present invention is that there is in the pressure chamber a contact plate means which is moveable from an upper position above the processing area downwardly to a contact position where the contact plate means presses against the pulp slurry to enhance liquid removal. Further, the contact plate means has opening means therein leading from above the contact plate to said processing area. The apparatus further comprises washing liquid input means to direct a washing liquid into the pressure chamber and onto the contact plate means where the washing liquid passes through the contact plate opening means to pass into said layer.

Preferably, the contact plate means comprises a plurality of contact plate through openings spaced over the contact plate means. The contact plate means has a lower contact surface formed with a plurality of recesses defined by slanted recess walls that slope downwardly and divergently from the contact plate openings.

One form of the contact plate recesses comprises grooves extending along a plurality of contact plate openings.

Another feature of the present invention is that the pressure differential means further comprises tube means connecting to the pressure differential chamber. Also, there is equalizing valve means arranged to selectively interconnect the pressure differential chamber with the pressure chamber. There is pressure reduction valve means which connects the tube means to a lower pressure area to create the lower pressure level in the pressure differential chamber.

In a preferred form, the tube means comprises a plurality of tubes, each of which has a pressure reduction valve means. Thus, liquid removed from the pulp layer can be selectively directed through one or more of said tubes.

To provide recirculation of the washed liquid, at least one of the tubes is directed to a liquid collecting location, and there is a recirculating line transmitting liquid as recirculated liquid from the liquid collecting location back to the pressure vessel. This recirculated liquid can then be used as wash liquid for said layer.

There is a fresh water liquid inlet to introduce fresh liquid into the pressure vessel to be used as wash liquid, and a discharge liquid outlet to dispose of at least a portion of the liquid removed from said layer. Also, in the preferred form there is a plurality of tubes which direct liquid from said layer to respective collecting areas, and a plurality of recycling lines to direct the collected liquid back to the pressure vessel for use as wash liquid in successive wash cycles.

A further feature of the present invention is a layer discharge means to remove the layer from the pressure chamber. This comprises a passageway having an inlet to receive the pulp mat from the conveying belt means. The discharge passageway is sized and configured to receive the pulp mat in substantial sealing relationship to the passageway. The passageway leads to a lower pressure location outside of said pressure chamber. The discharge means further comprises control outlet discharge valve means through which the mat is discharged from the lower pressure location.

The discharge means further comprises pressure discharge valve means to direct a pressurized fluid medium to act against material of said layer being discharged from the discharge passageway to move the material through the outlet discharge valve means in a preferred form, the pressurized fluid medium is directed from the pressure chamber through the pressure discharge valve means to act against the material from the mat.

The present invention desirably creates a pressure differential at least greater than 10 PSI, more desirably 20 PSI and yet more desirably at 50 to 100 PSI. In some instances, there may be advantages to go to yet higher pressures, such as 300 PSI or 500 PSI. This could be particularly advantageous, for example, where the pulp material to be processed in the present invention is being previously processed at a higher level, such at 300 PSI or 500 PSI. Also, desirably the liquid removal is accomplished at a higher temperature which is related to the temperature to which the liquid (usually water) can be raised at the operating pressure.

In the method of the present invention, the pulp slurry is directed into a pressure chamber and deposited as a layer over a processing area. While the pulp layer is stationary at the processing area, a pressure differential is applied across the pulp slurry to effect a liquid removal operation. Then the pressure differential is reduced (desirably to zero) after which the material is removed.

Other features of the present invention will be apparent from the following detailed description.

BRIEF DESCRIPTION OF THE DRAWINGS

FIGS. 4 and 5 are two side elevational views, similar to FIG. 1, but showing two main portions of the apparatus of the present invention separated from one another in position to be assembled;

FIG. 6 is an isometric view showing a portion of the conveying and pressure differential table unit of the present invention;

FIG. 12 is a top elevational view of only the pressure vessel of the fourth embodiment of FIG. 10, showing various locations of the openings therein;

FIG. 13 is a side elevational view of the pressure vessel of FIG. 12, showing in addition certain fittings;

FIG. 16 is a top elevational view thereof;

FIG. 17 is a transverse sectional view showing a portion of the table unit and a top portion of one of the conduits to which it is attached;

DESCRIPTION OF THE FIRST EMBODIMENT

It is believed that a clearer understanding of the present invention will be obtained by first describing somewhat briefly the main components of the apparatus of the first embodiment of the present invention, followed by a general description of its operation. After this, there will be a more detailed description of the first embodiment and also more specifics of its operation. Then there will be descriptions of further embodiments.

(a) General Description of the Apparatus

Figure 1:
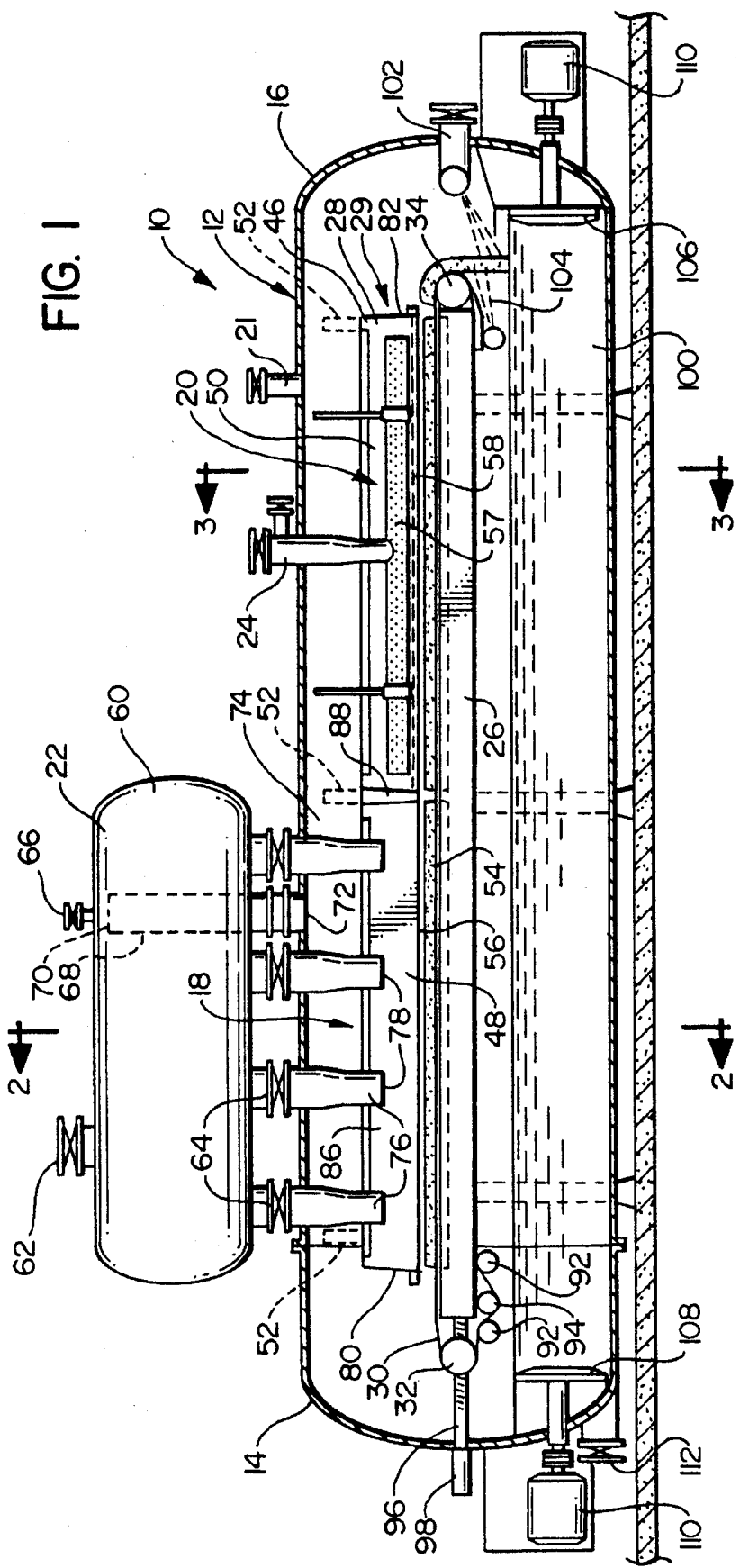
FIG. 1 is a side elevational view, partially in section, showing a first embodiment of the apparatus of the present invention.

With reference to FIG. 1, the apparatus 10 of the present invention comprises an elongate main pressure vessel 12 which remains pressurized throughout the operation of the apparatus 10. The vessel 12 has a forward end 14 and a rear end 16, and further has at its forward portion a dewatering area 18 and at a rear portion a washing area 20. At the dewatering area 18, there is a head-box 22 mounted above the pressure vessel 12 and containing a pulp slurry which is supplied into the dewatering area 18. At the rear portion of the pressure vessel 12 there is a water inlet 24 which directs the wash water into the washing area 20. Also, there is provided a pressure inlet 21 by which a pressurized gaseous medium (e.g. air, steam, or a combination thereof) can be directed into the vessel 12 from a pressure source.

The apparatus 10 can be considered as having two main operating sections that cooperate with one another to accomplish the major functions of the present invention. First, there is a conveying and pressure differential table unit 26, and second there is the enclosure frame unit 28. The table unit 26 and the enclosure frame unit 28 can be considered functionally as comprising a table assembly 29. The conveying and pressure differential table unit 26 will, for convenience, simply be called the "table unit" 26. The table unit 26 comprises an endless foraminous conveying belt 30 that travels around front and rear end rolls 32 and 34, respectively. The table unit 26 also comprises a support structure 36 that has two longitudinally extending left and right tubular side beams 38 and 40, between which extend an upper horizontal perforate plate 42 and a lower imperforate plate 43 (see FIG. 6). (The term "left" and "right" are taken from a rear location looking forwardly. See FIGS. 2 and 3.) These two plates 42 and 43 extend horizontally between the side beams 38 and 40 and are connected thereto, and these plates 42 and 43 define front and rear variable pressure chambers 44 and 45 in the operation of the present invention.

The enclosure frame unit 28 has a main frame structure 46 which in terms of function can be considered as having a forward mat forming frame section 48 and a rear wash water enclosure frame section 50. For convenience of manufacture and operation, these two frame sections 48 and 50 are simply made as a single unitary frame structure 46. The frame structure 46 is mounted by a plurality of hydraulic or pneumatic lifting jacks 52 so that the frame structure 46 can be raised a moderate distance above the upper run of the belt 30 of the table unit 26 or lowered into engagement with the belt 30 and also side portions of the support structure 36.

(b) General Description of the Operation

With the foregoing general description in mind, there will now be a brief description of the overall operation of the present invention. Initially, the interior of the vessel 12 is pressurized, and the jacks 52 are used to lower the frame structure 46 onto the table unit 26. The table unit 26 and the frame structure 46 are arranged so that when the frame structure 46 is in its lower belt engaging position, the forward mat forming frame section 48 forms a peripheral enclosure entirely around the dewatering area 18, and at the same time the rear wash water enclosing frame section 50 forms a peripheral enclosure entirely around the dewatering area 20.

Figure 2:
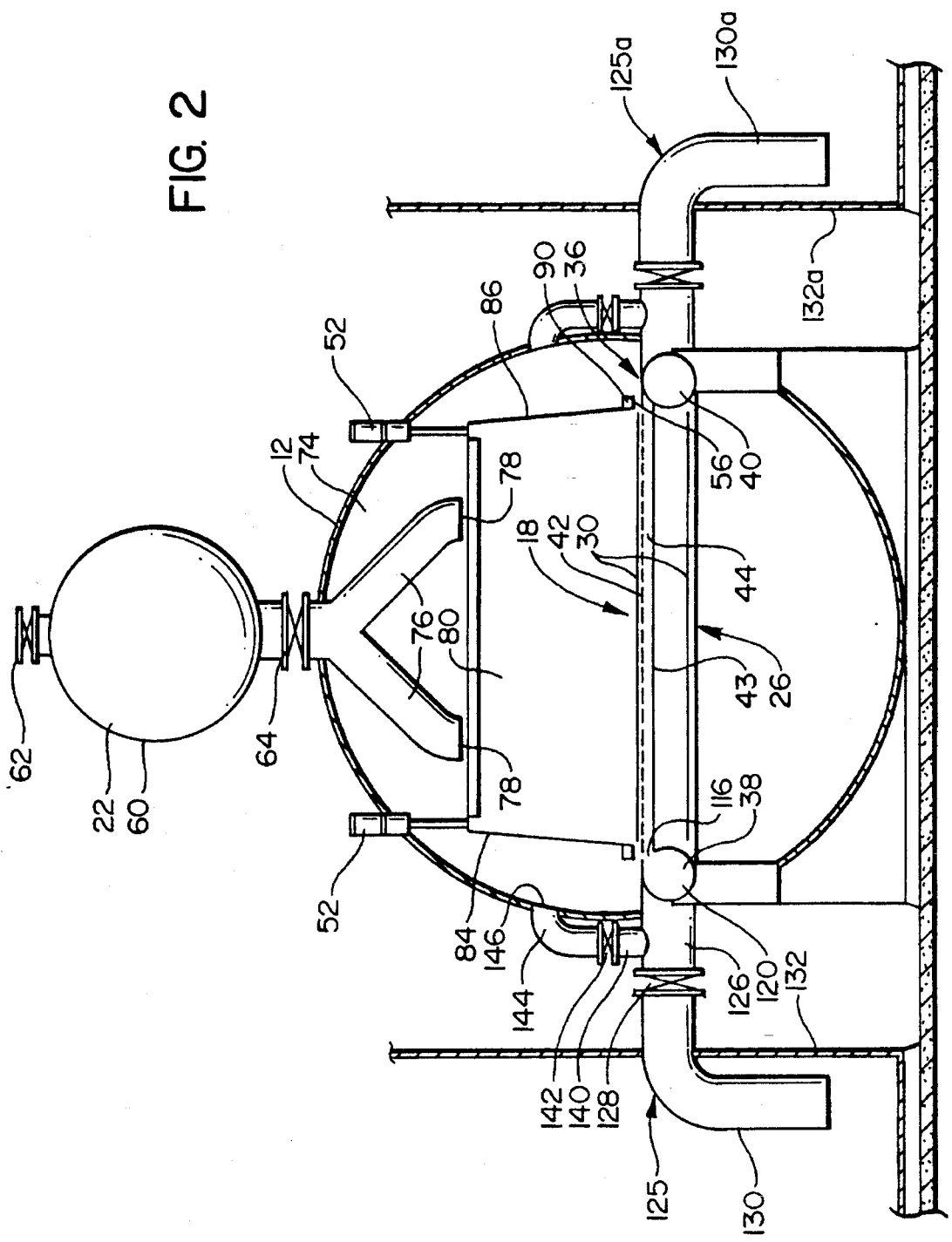
FIG. 2 is transverse sectional view taken along line 2—2 of FIG. 1 at the dewatering area of the apparatus of the first embodiment.
Figure 3:
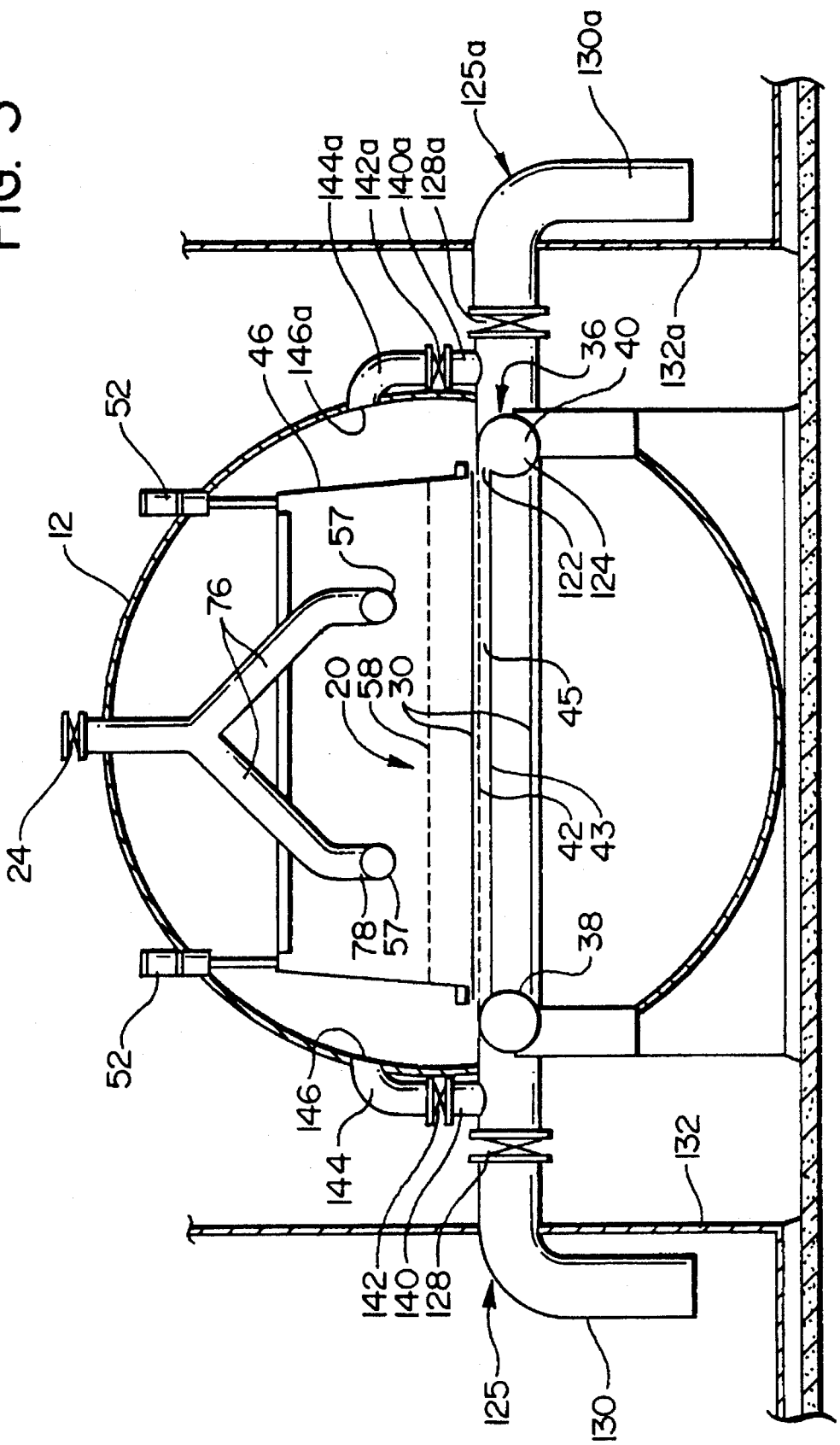
FIG. 3 is a transverse sectional view taken at line 3—3 of FIG. 1 at the washing area of the apparatus.

The frame structure 46 is shown in FIG. 1 in its raised position, and is shown in FIGS. 2 and 3 in its lower position engaging the table unit 26. To initiate the operation of the apparatus 10, with the enclosing frame structure 46 in its lower position, the pulp slurry is directed from the headbox 22 onto that area of the belt 30 that is at the dewatering area 18 and enclosed by the forward mat forming frame section 48. When there is an adequate depth of pulp slurry over the belt portion in the dewatering area (e.g. approximately an inch depth or possibly moderately greater), then the apparatus 10 is operated in a manner to create a pressure differential between the space above the pulp slurry layer (which is the pressure level within the pressure vessel 12) and the forward variable pressure chamber 44 defined by the forward portions of the horizontal plates 42 and 43. This pressure differential causes the liquid in the slurry on the belt 30 in the dewatering area 18 to be forced from the pulp into the forward low pressure chamber 44, from which the liquid is removed through the left tubular side beam 38. (The precise apparatus and method by which this is accomplished will be described more fully later herein.)

As the liquid is being pushed from the mat into the forward low pressure chamber 44, additional pulp slurry material is being discharged into the dewatering area 18 until a desired depth is reached (e.g. between 5 to 10 inches, depending upon the consistency or the pulp slurry and desired basis weight of the stock and other operating conditions). When the pulp slurry in the dewatering area 18 has been exposed to the pressure differential for a sufficient length of time so that an adequate percentage of the water is removed, the apparatus 10 is operated in a manner to be described hereinafter to equalize the pressure between the forward low pressure chamber 44 just below the pulp mat 54 and the overall hitch pressure within the vessel 12 with this being done, the only force on that portion of the belt 30 in the dewatering area 18 is the weight of the pulp mat 54.

Then the frame structure 46 is raised so that the lower edge 56 of the frame structure 46 is above the level of the pulp mat 54 that has been formed on the belt 30 at the dewatering area 18. Typically, in this first embodiment this mat after dewatering will have a consistency of between about fifteen (15%) percent to twenty five (25%) percent, depending upon a number of factors. (By way of background explanation, as used herein, the term "consistency" is a percentage value equal to the percentage of wood pulp by weight to the total weight of the slurry. In other words, if the slurry is 98% liquid, which liquid includes the solids dissolved or contained therein, and only 2% pulp, then this would be 2% consistency.)

Then the conveying belt 30 is operated to move rearwardly in a manner to move the pulp mat 54 from the dewatering area 18 rearwardly to the washing area 20, at which time the belt 30 is stopped. Then the frame structure 46 is lowered into place, so that the rear wash water enclosing frame section 50 encloses the pulp mat 54 in a close peripheral fit. With this being accomplished, the water inlet 24 is operated in a manner to direct wash water into the washing area 20. More specifically, there is a distribution pipe 57 and a perforate water distributing plate 58 that extends horizontally entirely across the rear frame section 50, so as to be positioned a short distance above the top surface of the pulp mat 54, and also has enclosing side walls. The washing water from the inlet 24 distributes itself over this perforate plate 58 and then drops onto the top surface of the pulp mat 54 in a manner to cause little impact thereon.

At the same time that the wash water is being discharged into the washing area 20, an additional quantity of pulp slurry is being discharged from the headbox 22 into the dewatering area 18 in the same manner as described earlier herein. This is done while the above atmospheric pressure is maintained in the vessel 12. Also, shortly after the wash water is being directed into the washing area 20 and the pulp slurry is being discharged into the dewatering area 18, the apparatus is operated (in a manner to be described more specifically hereinafter) to reduce the pressure in both low pressure chambers 44 and 45. (As described previously, this reduction of pressure in the forward chamber 44 has the effect of causing the liquid in the pulp slurry in the dewatering area 18 to flow downwardly into the forward low pressure chamber 44.)

The lowering of the pressure in the rear low pressure chamber 45 causes a "displacement washing" of the liquid that remains in the pulp mat 54. More specifically, the greater pressure above the level of wash water on top of the pulp mat 54 in the washing area 20 causes this layer of wash water to press downwardly into the mat 54 and displace the liquid (commonly called "black liquor") that is in the pulp mat 54. When the black liquor liquid in the pulp mat 54 is substantially entirely displaced, then the pressure in the rearward low pressure chamber 45 is increased so that it becomes equal with the overall pressure within the pressure vessel 12. At that time, the washing of the pulp mat 54 in the washing area 20 is accomplished.

After the simultaneous washing and dewatering operations are accomplished, then the conveyor belt 30 is again moved rearwardly so that the rearwardly positioned pulp mat 54 that has been washed is moved on for further processing, while the second pulp mat 54 which has been newly formed at the dewatering area 18 is moved rearwardly into the washing area. Then the same overall process is repeated as described immediately above.

It is to be recognized that the simultaneous dewatering and washing operations on the two pulp mats 54 at two different areas are coordinated so that each operation takes approximately the same time. For this reason, it may be that the amount of dewatering that is accomplished in the dewatering area 18 may be reduced moderately so that it would take about the same time to form the pulp mat 54 at the dewatering section 18 as it would to wash the previously formed pulp mat 54 that is being washed at the washing area 20. For example, it might be that it would be quite practical to dewater the pulp mat 54 in the dewatering zone to a 25% consistency, but that this would take longer than it would take to cause a simultaneous washing operation of such a pulp mat. To optimize the timing, it might be better to, for example, cause the pulp mat 54 to be formed and dewatered in the dewatering zone 18 to only a 20% consistency, and leave some additional dewatering to be done in the washing zone before applying the wash water.

At this point, it should be noted that the only times the pulp mats 54 are moved by the belt 30 are during the periods when the pressures above and below the pulp mats 54 are equalized, so that the only force on the belt 30 pressing it against the stationary perforate plate 42 is simply the weight of the pulp mats 54. On the other hand, while the pulp mats 54 are stationary, the pressure differential applied across both of the pulp mats 54 can be relatively large. One of the limitations in prior art apparatus which accomplishes dewatering and/or washing on a continuously moving foraminous belt is that the pressure differential cannot be so large so that the frictional engagement between the conveyor belt and the belt support is so great that the resisting force provided by the friction is too great for practical operation. This same disadvantage does not apply in the operation of the present invention. On the contrary, the limitation on the amount of pressure differential would depend primarily upon the ability of the support structure to withstand such pressure differential while the belt is stationary, and would also depend upon the optimized operating conditions for accomplishing the dewatering and washing. It is presently contemplated that the pressure differential in the dewatering zone 18 could be in the range of 50 to 150 pounds per square inch, and could possibly be as high as 300 pounds per square inch or higher. In the washing area 20, it is contemplated that the pressure differential across the mat during washing could be as high as 50 to 150 pounds per square inch, and could conceivably be as high as 300 pounds per square inch or higher. This will vary, depending upon further analysis, upon the nature of the pulp being processed, and other operating conditions. Higher than 300 pounds per square inch pressure differential would be utilized, for example, when the invention is used directly after a continuous digester and the pulp slurry is fed into the apparatus 10 under full digester pressure.

c. More Detailed Description of the Invention

The headbox 22 is, or may be, of itself, of more or less conventional design. As shown herein, the headbox 22 comprises a containing structure 60 having an upper inlet valve 62 and a plurality of lower outlet valves 64. There is an upper pressure relief valve 66 and a vent pipe 68 having an open upper end 70 at the upper part of the container 60 and having an open lower end 72 opening to the interior chamber 74 of the pressure vessel 12. As can be seen in FIG. 2, each of the outlet valves 64 leads into two related branch pipes 76 that discharge the pulp from the laterally spaced lower ends thereof 78 into the enclosure defined by the forward mat forming frame section 48 of the frame structure 46. As shown herein, there are four such outlet valves 64 and a total of eight branch pipes 76 to provide a proper distribution of the pulp slurry into the dewatering area 18.

The frame structure 46 has an overall rectangular configuration with an open top and an open bottom. More particularly, there are front and rear end walls 80 and 82, respectively, left and right side walls 84 and 86, respectively, and an intermediate transverse wall (a portion of which is shown at 88). It can readily be seen that the intermediate wall 88 divides the frame structure 46 into the front and rear frame sections 48 and 50 so as to define the perimeters of the dewatering area 18 and the washing area 20. Further, it can be seen that the material containing surface of each of the walls 80 through 88 has an upper inward taper. This enables the frame 46 to be moved upwardly without disturbing the mat 54 that has been formed. Further, with regard to the rear frame section 50, this permits the frame section 50 to be lowered onto the already formed mat 54 without disturbing the side edges. Further, each of the walls 80 through 88 is provided with a lower peripheral seal, which is indicated at 90. This seal is or maybe of conventional design.

To turn our attention now to the table unit 26, the belt 30, as indicated previously, engages the front and rear end rolls 32 and 34. In addition, it engages two idler rolls 92 and a guide roll 94. The front roll 32 can be adjusted forwardly and rearwardly by two screw adjustment devices 96 that engage a mounting bearing housing on opposite sides of the front roll 32. An adjustment cylinder or motor 98 is provided for each screw 96, and each is positioned outside of the pressure vessel 12. Since these adjustment devices 96 are already well known in the prior art, these will not be described further herein. The rear roll 34 is a drive roll, and this is powered by a suitable hydraulic motor, which for ease of illustration is not shown herein.

Also, at the end of each processing cycle, when the upper run of the belt 30 is moved rearwardly, the rearmost pulp mat 54 is simply directed over the belt 30 at the end of the rear drive roll 34 to drop into a lower repulping chamber 100. As the mat 54 is discharged off the rear drive roll 34, it is sprayed on the back side by a dilution spraying device 102 and on the front side by a doctor spraying device 104. In the repulping chamber 100, there are rear and forward repulping agitators 106 and 108 that are driven by respective motors 110 to agitate the pulp and cause it to mix with the dilution liquid. The reconstituted pulp then can be discharged through a forwardly positioned valve 112.

To describe the conveying support structure 36, reference is now made to FIG. 6. As discussed previously, this support structure 36 comprises left and right tubular beams 38 and 40 which are conveniently made with a cylindrical cross-section. Also, as discussed previously there is an upper horizontal perforate plate 42 and a lower imperforate plate 43. The perforate plate 42 extends between uppermost portions of the tubular beams 38 and 40 and has a plurality of closely spaced relatively small through openings 114. The upper run of the conveyor belt 30 rests directly on the upper perforate plate 42. The lower imperforate plate 43 is positioned a short distance downwardly from the upper plate 42, and fixedly attached (e.g. by welding) as a fluid tight connection to the left and right tubular beams 38 and 40.

The particular section of the support structure 36 shown in FIG. 6 is at the forward dewatering zone 18, and it will be noted that the left tubular beam 38 has a plurality of openings 116, which communicate with the chamber 44 defined by the upper and lower plates 42 and 43. Positioned within this chamber 44 is a plurality of transversely extending support spacing bars 118. These support spacing bars 118 are of a sufficient width (e.g. possibly made of steel an eighth of an inch to a quarter of an inch thick) to provide structural support and yet leave sufficient open space for the liquid to be drawn through the belt 30 and through the plate openings 114 into the chamber 43. It should be noted that the rather substantial load imposed upon the plates 42 and 43 are what can be considered as compression loads tending to push these two plates together. In other words, the area above the plate 42 and below the plate 43 are exposed to the greater than atmospheric pressure within the tank 12, while during certain phases of the operation, there is a reduced pressure (e.g. in the preferred arrangement atmospheric pressure or near atmospheric pressure) in the chamber 44. The spacing bars 118 are of sufficient strength and are spaced at sufficiently close intervals to withstand these substantial compression loads. Also, the openings 116 are aligned to communicate to the spaces between the spacing bars 118. These openings 116 lead from the forward low pressure chamber 44 into a passageway 120 defined by the left beam 38. The support structure also has a lower support plate 121 or the like to support the lower run of the belt 30.

With reference to FIG. 3, it can be seen that in the washing section, the table unit 26 has substantially the same overall configuration as shown in FIG. 6, with one exception, which is that the openings 122 leading from the rear low pressure chamber 45 lead into a passageway 124 defined within the right tubular beam 40. Thus, the liquid which is displaced from the mat 54 during the washing operation passes into the rear low pressure chamber 45 and through these openings 122 and into the passageway 124 provided by the right tubular beam.

To describe now the manner in which the pressure differential is accomplished in the low pressure zones 44 and 45, it should first be understood that the pressure in the main vessel 12 is maintained at a level higher than atmospheric pressure. The medium supplying the pressure within the vessel 12 can be air, steam or for some applications possibly some other pressure generating medium.

With reference to FIG. 2, there is a pressure differential device or apparatus 125 which comprises a first pipe section 126 which connects directly with the passageway 120 in the left tubular beam 38 and leads to a control valve 128 that communicates with another pipe section 130 that in turn leads to an atmospheric tank shown schematically at 132. The control valve 128 controls the pressure in the pipe 126 so as to control the pressure differential between the chamber 44 and the interior of the pressure vessel 12.

Also, there is another pipe section 140 leading from the pipe section 126 through a valve 142 to a further pipe section 144 that communicates directly with the interior of the pressure vessel 12 through an opening 146. By closing the valve 128 and opening the valve 142, this causes the pressurizing medium (e.g. usually air or steam) in the vessel 12 to apply pressure into the pipe section 126, through the passageway 120 and through the holes 116 to the variable pressure chamber 44, thus equalizing the pressure in the chamber 44 with the pressure within the vessel 12.

To describe the manner in which this pressurizing apparatus 125 is operated, let it be assumed that it is desired to have the pressure within the chamber 44 to be the same as the pressure inside the main pressure vessel 12. In this instance, as indicated above, the valve 128 is closed, and valve 142 is opened. However, if it is desired to lower the pressure in the variable pressure chamber 44, then the valve 142 is closed, and the valve 128 is opened.

A second pressure differential apparatus is provided for the rear variable pressure chamber 45. Since this second pressure differential apparatus is substantially the same, in both structure and function, as the first differential apparatus 125, there will not be a detailed description of the same. Rather, it will simply be given like numerical designations, with an "a" suffix distinguishing the corresponding components of the second pressure differential apparatus, which is designated 125a.

There will now be a more detailed description of the precise mode of operation of the pressure differential devices 125 and 125a relative to the overall operation. As discussed earlier herein with regard to the overall operation of the present invention, an initial step is to lower the frame structure 46 onto the table unit 26. At this time, since there is no pulp slurry or mat on top of the conveyor belt 30 either at the dewatering location 18 or at the washing location 20, the pressures within the chambers 44 and 45 will be the same as the pressure in the pressure vessel 12, since the air, steam or other medium within the pressure vessel 12 can communicate freely with the two variable pressure chambers 44 and 45 through the openings 114 in the upper perforate plate 42. At this time, the valves 128 and 128a both are closed, and the equalizing valves 142 and 142a may be left closed or open. However, at such time as either of the valves 128 or 128a is opened to create a pressure differential in their respective chambers 44 or 45, the appropriate valve 142 or 142a must be closed.

As described previously in connection with the operation of the present invention, at the start of the operation, the pulp slurry is directed onto that portion of the belt 30 that is at the dewatering zone 18. When an adequate level of pulp slurry (e.g. approximately one inch or more) is deposited on the belt portion at the dewatering section 18, the valve 128 is opened (and the valve 142 is closed) to cause the forward low pressure chamber 44 to be exposed to the lower pressure within the pipe section 130. This creates a pressure differential relative to the chamber 44 to cause the liquid in the pulp slurry to flow through the conveying belt portion at the dewatering zone 20 and into the low pressure chamber 44.

When the dewatering operation has been carried on for the desired time to form a pulp mat 54 of the desired consistency, then the valve 128 is closed, and the equalizing valve 142 is opened. At that time, the low pressure chamber 44 will be full of liquid removed from the pulp slurry, and also the passageway 120, the tubular be am 38, as well as in the pipe section 126, will be full of liquid. That liquid will simply be brought to a pressure equal to the pressure in pressure vessel 12, so that there will be no net force on the upper run of the conveying belt 30, except for that downward force exerted by the weight of the pulp mat 54 formed on the conveying belt 20.

As indicated previously in the general description of the operation of the present invention, after the pulp mat 54 has been formed, and dewatered to the desirable consistency, the frame structure 46 is raised, and the conveying belt 30 is moved in a rearward direction to move the newly formed pulp mat 54 to the rear washing location 20. Then the frame structure 46 is again lowered to be in engagement against the table unit 26, and the operation is continued as described previously herein. Specifically, a second portion of pulp slurry is deposited onto that portion of the belt 30 that is in the dewatering zone 18, and at the same time the washing operation is started at the washing area 20. (It will be recalled that it was mentioned earlier that under certain circumstances it may be desired to accomplish the final part of the dewatering in the washing area 20, in which case the wash water would not immediately be applied directly to the upper surface of the mat 54 at the washing area 20, but the dewatering would occur for a short period of time to simply remove additional liquid from the mat 54 at the washing area 20. Then the washing water would be applied.)

With a newly formed mat 54 being located at the washing area 20, and with the pulp slurry being deposited on the belt portion at the dewatering area 18, the pressure differential is now applied to both low pressure chambers 44 and 45. The method of causing the pressure differential in the zone 44 has been just described above, and the same method would be used in causing the pressure differential at the rear low pressure chamber 45, except that the liquid collected in the rear low Pressure chamber 45 is directed into the right tubular beam member 40. Accordingly, a description of this will not be repeated herein.

Figure 4:
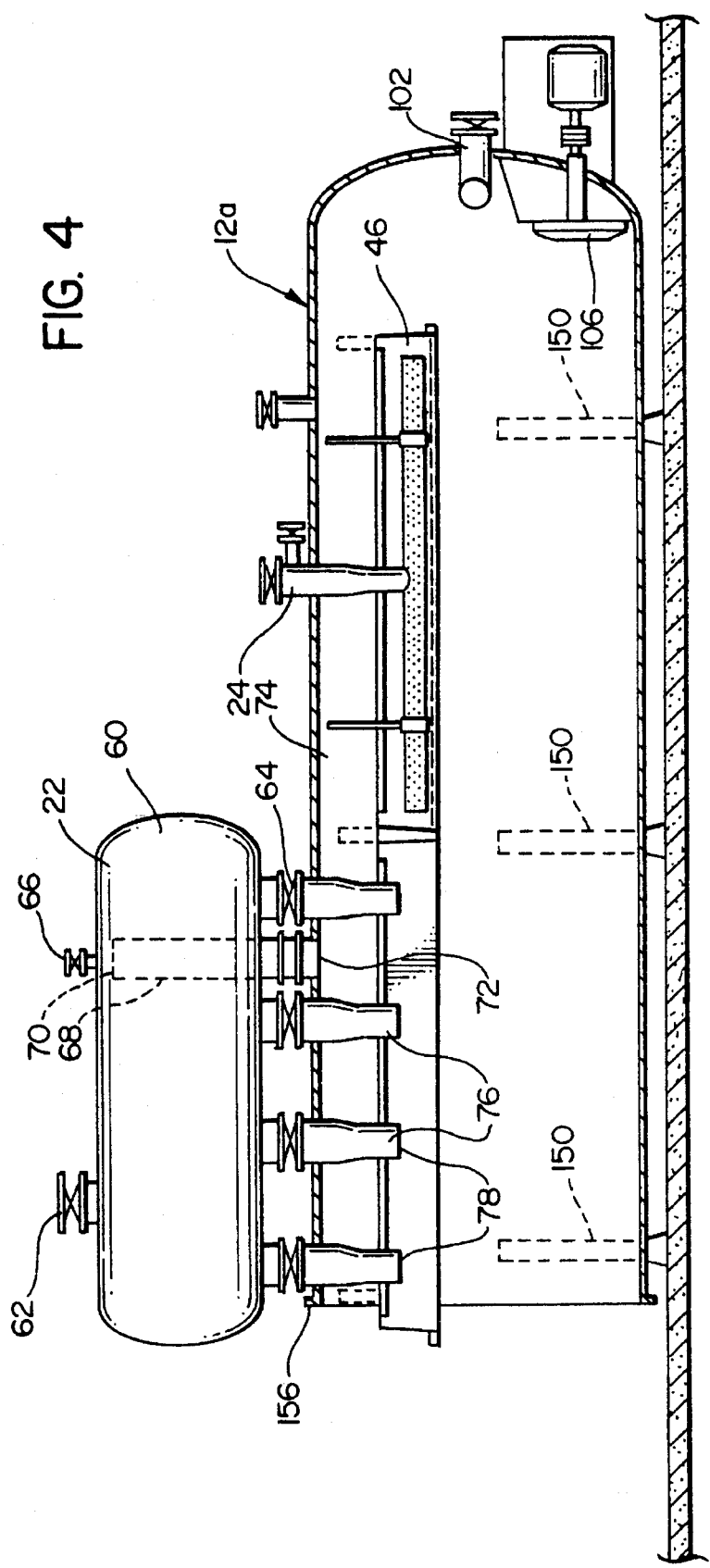

To describe another facet of the present invention, reference is now made to FIGS. 4 and 5. For convenience of manufacture and maintenance, the pressure vessel 12 is made as two sections, namely a main rear section 12a (See FIG. 4), and a smaller front section 12b (See FIG. 5). The headbox 22, the wash water inlet 24, and the frame structure 46 are all mounted to the main rear pressure vessel section 12a. Further, the dilution spraying device 102 and the rear agitator 106 are mounted in the rear vessel section 12a. Appropriate support members 150 are provided at spaced locations within and along the length of the pressure vessel section 12a to provide support for the support structure 36 of the table unit 26.

The table unit 26 has its forward end mounted in the front housing section 12b (See FIG. 5), and the aforementioned front and rear rolls 32 and 34, the idler rolls 92, the guide roll 94 and the screw adjustment devices 96 are all mounted in the forward pressure vessel section 12b. The forward agitator 108 with its associated motor 110, and also the forward discharge valve 112 are mounted in this vessel section 12b. The two pressure differential devices 125 and 125a are also mounted to the forward housing section 12b, but are not shown in FIG. 5 for convenience of illustration.

The entire forward pressure vessel section 12b and the table unit 26 are carried by a suitable temporary mobile support vehicle 152 into the interior of the main pressure vessel housing section 12a. When the table unit 26 has its major portion within the rear pressure vessel section 12a, then the mobile support vehicle 152 is removed, and other means can be used to support the forward pressure vessel section 12b to complete the rearward movement of this vessel section 12b. When the two pressure vessel sections 12a and 12b abut one another, they can be joined by appropriate means at the location of their matching adjoining flanges 154 and 156.

d. Description of the Second Embodiment

Figure 7:
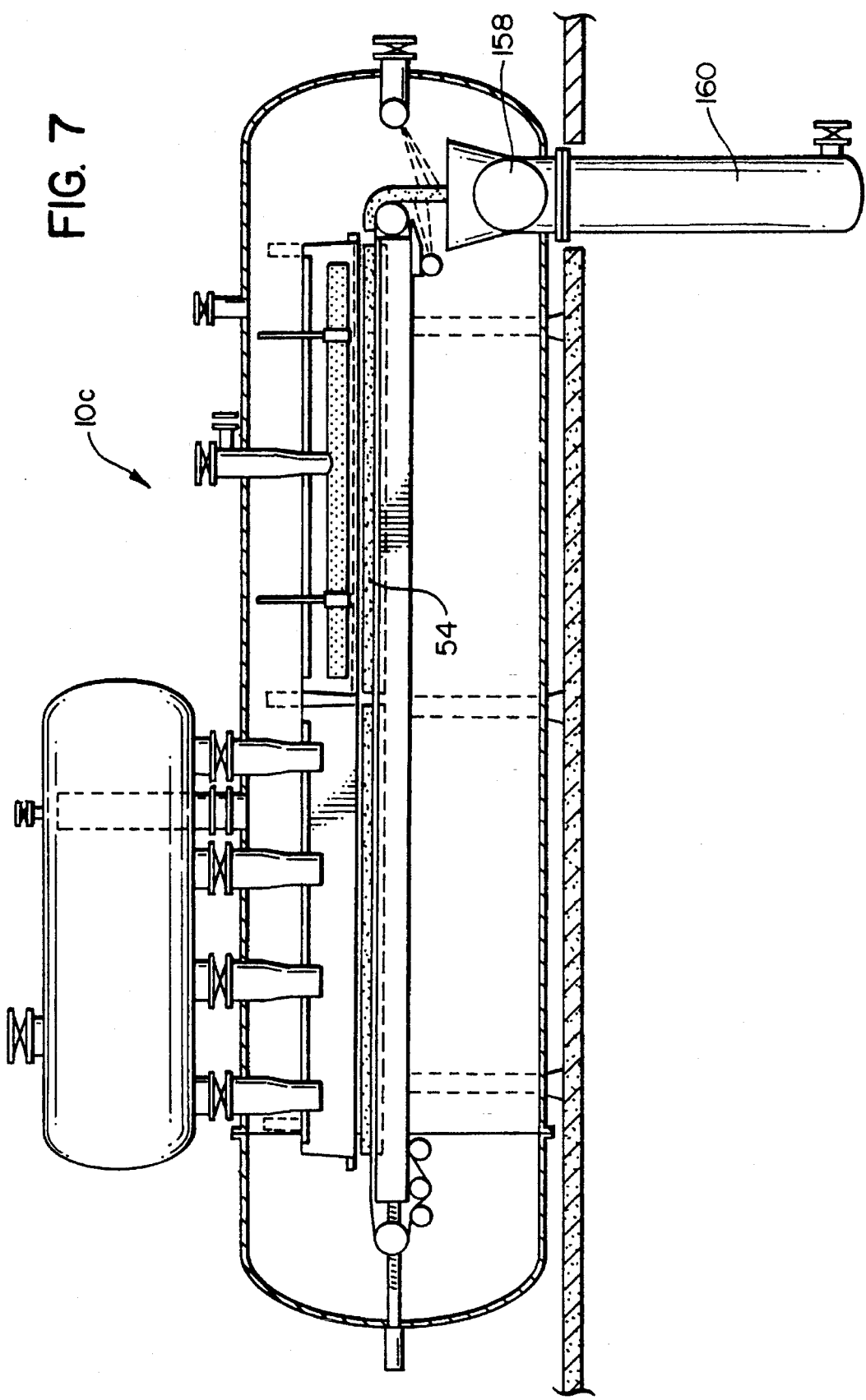
FIG. 7 is a view similar to FIG. 1, but showing a second embodiment of the present invention.

A second embodiment 10c of the present invention is shown in FIG. 7. This second embodiment is substantially the same as the first embodiment, except that instead of using the pulp agitators, the pulp mat 54 from the washing section is directed into a feed screw section 158 that directs the pulp through a conduit 160 to a discharge location for further processing.

e. Description of the Third Embodiment

Figure 8:
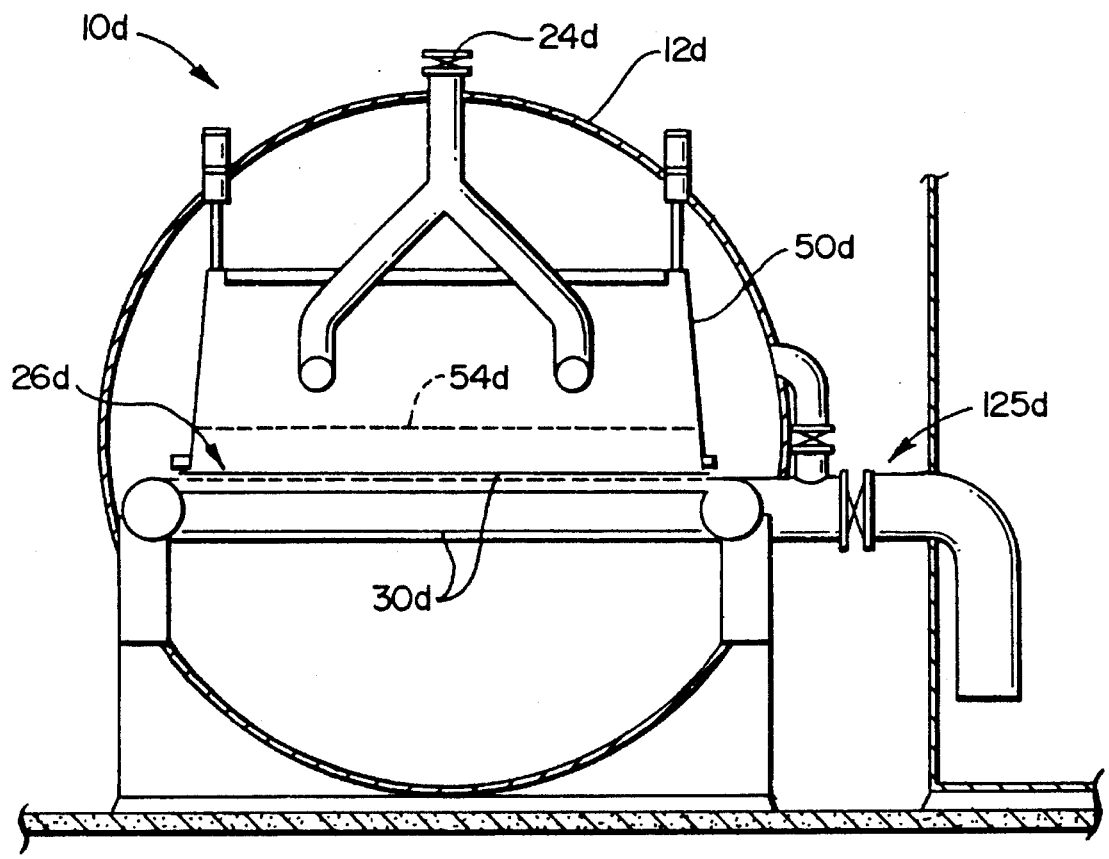
FIG. 8 is a view similar to FIG. 3 showing a third embodiment of the present invention.

FIG. 8 illustrates a third embodiment 10d of the present invention. The apparatus shown in FIG. 8 is quite similar to that shown in FIG. 3, and for convenience, components in this third embodiment which are similar to the components shown in FIG. 3 will be given like numerical designations with the "d" distinguishing those of this third embodiment. As presently described, this apparatus shown in FIG. 8 is added as a third processing area or station to be positioned rearwardly of the washing area 20, and this third processing area is used to impregnate the pulp mat 54d with a suitable liquid or liquid chemical or the like, for example as part of a bleaching treatment, treatment with oxygen or chlorine, etc. Further, there could even be a fourth processing area where the treatment medium (e.g. the bleaching agent) is removed by a subsequent washing operation, as described previously herein.

To return to the description of the apparatus shown in FIG. 8, there is the pressure vessel 12d which is a rearward extension of the previously described pressure vessel 12. There is a liquid inlet 24d, and there is a rear frame section 50d which could be part of the frame section 46, or possibly a totally separate frame section. There is a table unit 26d which could simply be a rearward extension of the previously described table unit 26, and also the pressure differential device 125d.

In the operation of the third embodiment, the pulp mat 44d is moved into the processing area, and the liquid treatment medium is discharged through the inlet 24d and deposited onto the pulp mat 54d, in much the same manner as the washing liquid is deposited, as described herein relative to FIG. 3. Then the pressure differential is applied so that this liquid treatment medium is forced to flow into the pulp mat 54d and displace the previous liquid medium therein (which in this particular instance would be the wash water that is forced out).

Thereafter, the frame section 50d is raised, and the conveyor 30d operated to move the pulp mat rearwardly to a further processing location or to a discharge location.

Figure 9:
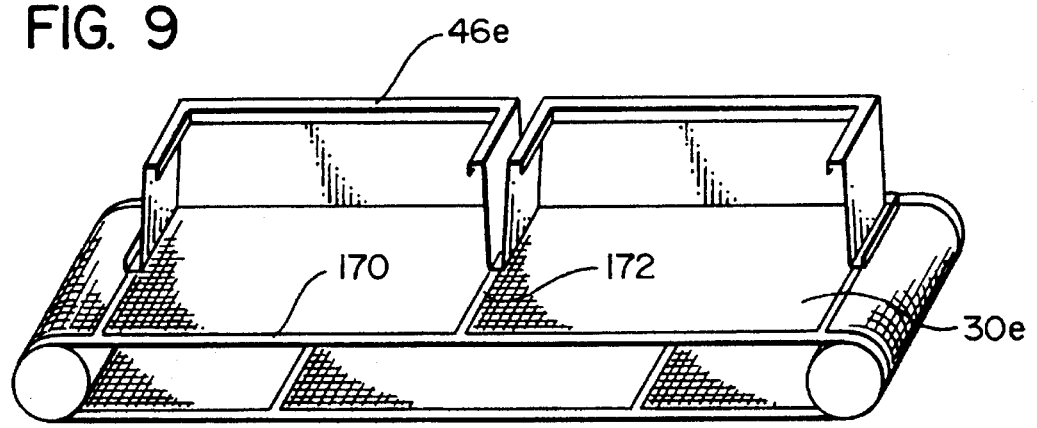
FIG. 9 shows a modified form of the conveying belt of the present invention.

In FIG. 9 there is shown a modified version of the conveying belt 30, and this modified version will be designated 30e. It will be recalled that the lower peripheral edges of the frame section 46 are moved downwardly to engage the upper run of the belt 30, and the lower side edges of the frame section 46 engage the beams 38 and 40. In this alternative arrangement, the conveying belt 30e has certain portions thereof made imperforate, and these imperforate sections are made in elongate strips so that these match the lower sealing edges of the frame section 46. Thus, the lower sealing edges of the frame section 46 engage these elongate imperforate strip portions of the belt 30e, so that there is a liquid type seal made between those imperforate portions of the belt 30e and the matching lower sealing edge portions of the frame section 46e. In the drawing of FIG. 9, the longitudinally extending edge imperforate strip portions are designated 170, and the transverse imperforate sections are designated 172. Various means could be used to form these imperforate strips 170–172. For example, neoprene rubber or some suitable resin (silicone) that would harden and yet permit some moderate degree of flexibility could be used.

f. Description of the Fourth Embodiment

The fourth embodiment of the present invention will now be described with reference to FIGS. 10 through 30. This fourth embodiment is similar to the first three embodiments in that there is a pressure vessel enclosing the main operating components, a table unit having a conveyor and a table portion to provide a pressure differential, and a moveable enclosure frame.

However, this fourth embodiment differs from the prior three embodiments in several major respects. First, the dewatering and the washing of the pulp is accomplished sequentially at the same processing location. Second, to enhance the dewatering and washing process, there is provided a dewatering/washing plate assembly which presses against the top of the pulp mat to aid in the dewatering, and also assists in accomplishing the washing. Third, there is added a wash water recycling system to accomplish a plurality of countercurrent washing steps. Fourth, there is a different discharge system by which the processed pulp mat is removed from the pressure vessel. In addition to the differences noted immediately above, there are other differences or modifications which will become apparent from the following detailed description.

Figure 10:
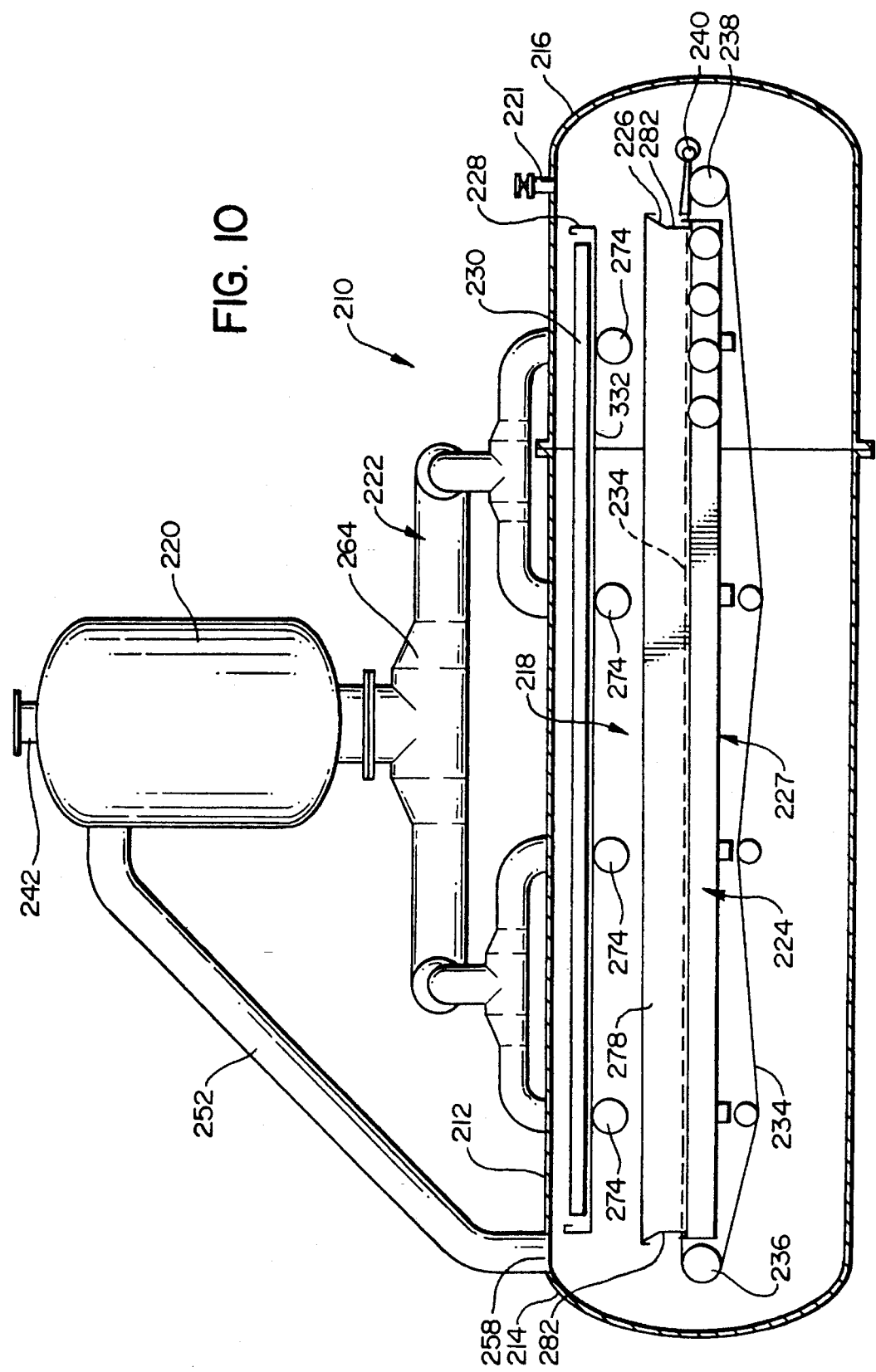
FIG. 10 is a side elevational view, taken partly in section, showing a fourth embodiment of the present invention.
Figure 11:
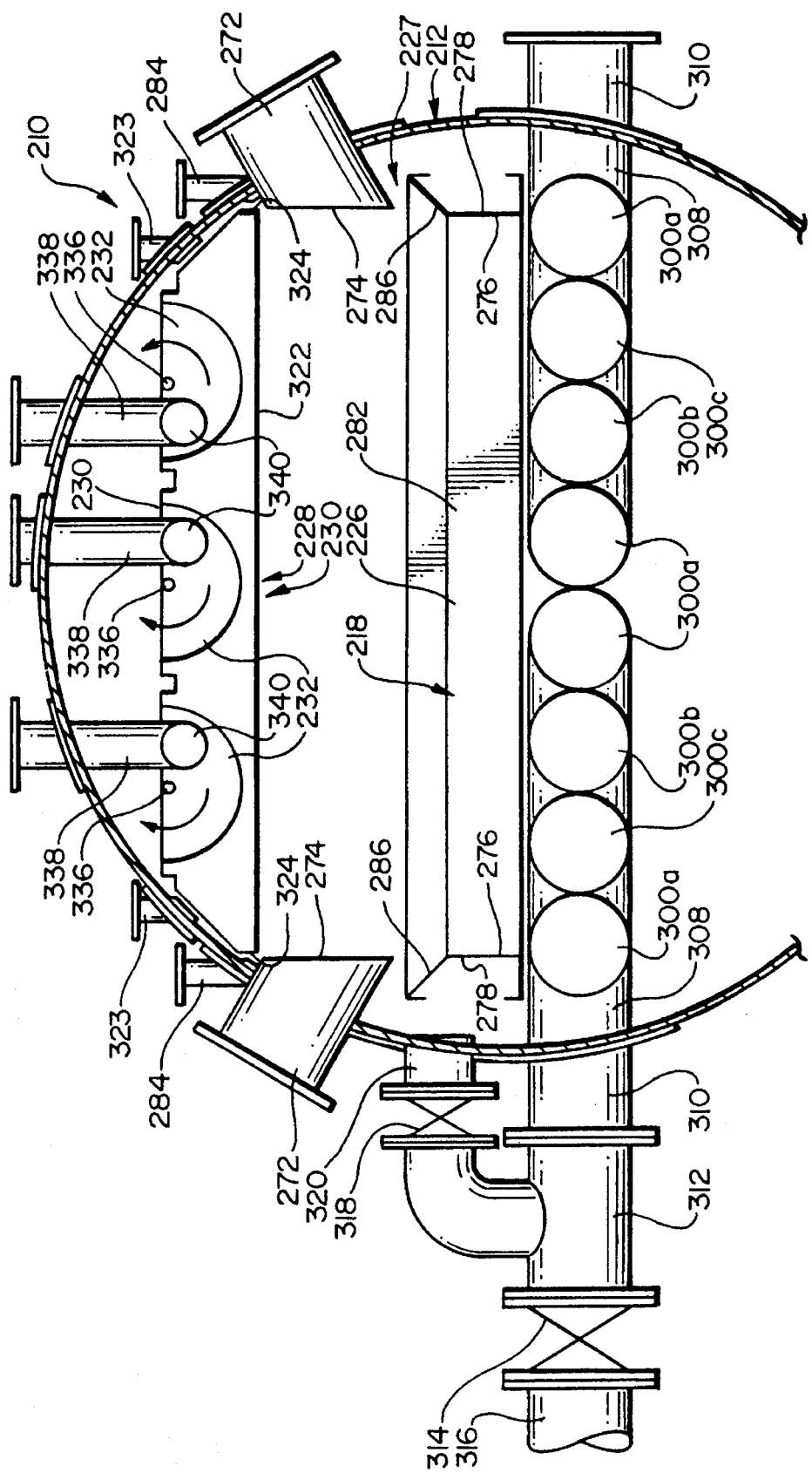
FIG. 11 is a sectional view taken along line 11—11 of FIG. 10.

With reference first to FIGS. 10 and 11, the fourth embodiment 210 has (as in the first embodiment) a main pressure vessel 212 with front and rear ends 214 and 216. There is a single processing area 218 which is both a dewatering and washing processing area and which occupies a substantial portion of the pressure vessel 212.

As in the first embodiment, there is a head box 220 for the pulp slurry to be processed, a pressure inlet 221, and also a manifold system 222. Positioned within the pressure vessel 212 there is a conveying and pressure differential table unit 224. As will be disclosed more fully later herein, this table unit 224, in conjunction with other components, accomplishes both the dewatering and washing operations sequentially.

Also positioned within the pressure vessel 212 is an enclosure frame 226 which performs a function similar to the enclosure frame 28 of the first embodiment to contain the pulp slurry and wash water, in a manner that there is a sealed area to accomplish the dewatering and washing. In terms of function, the table unit 224 and the enclosure frame 226 can be considered to function as a table assembly 227 that contains the pulp slurry and accomplishes certain processing functions.

As a new feature in this fourth embodiment, there is a dewatering/washing plate assembly 228 which, during the latter part of the dewatering operation and during the washing sequence, is pressed against the top surface of the pulp slurry being processed. This plate assembly 228 has been found to significantly improve the operation of the present invention, and its function will be discussed in more detail later herein.

Just above the plate assembly 228 is positioned a wash water dispensing assembly 230 which comprises a plurality of dispensing troughs 232. This trough assembly 230 provides a convenient means for dispensing the wash water sequentially onto the plate assembly 228 during the wash cycles.

As in the first embodiment, the table unit 224 comprises a conveyor belt 234 which engages front and rear rolls 236 and 238. The upper run of this conveyor belt 234 extends along the top portion of the table unit 224 and functions in a manner similar to the conveying belt 30 of the first embodiment.

At the rear end of the conveying belt 234 there is a pulp discharge assembly 240 which, as indicated above, functions somewhat differently than the discharge mechanism of the prior embodiments. In general, this discharge assembly 240 receives the processed pulp mat directly from the conveying belt 234 and moves the pulp mat through a discharge passageway at which the pulp mat forms a substantial seal. Then as the pulp mat is moved into a discharge area, pressurized gas (e.g. air or steam) from inside the vessel 212 moves the processed pulp material through a valve to a location outside the pressure vessel 212. This will be described in more detail later herein.

Figure 14:
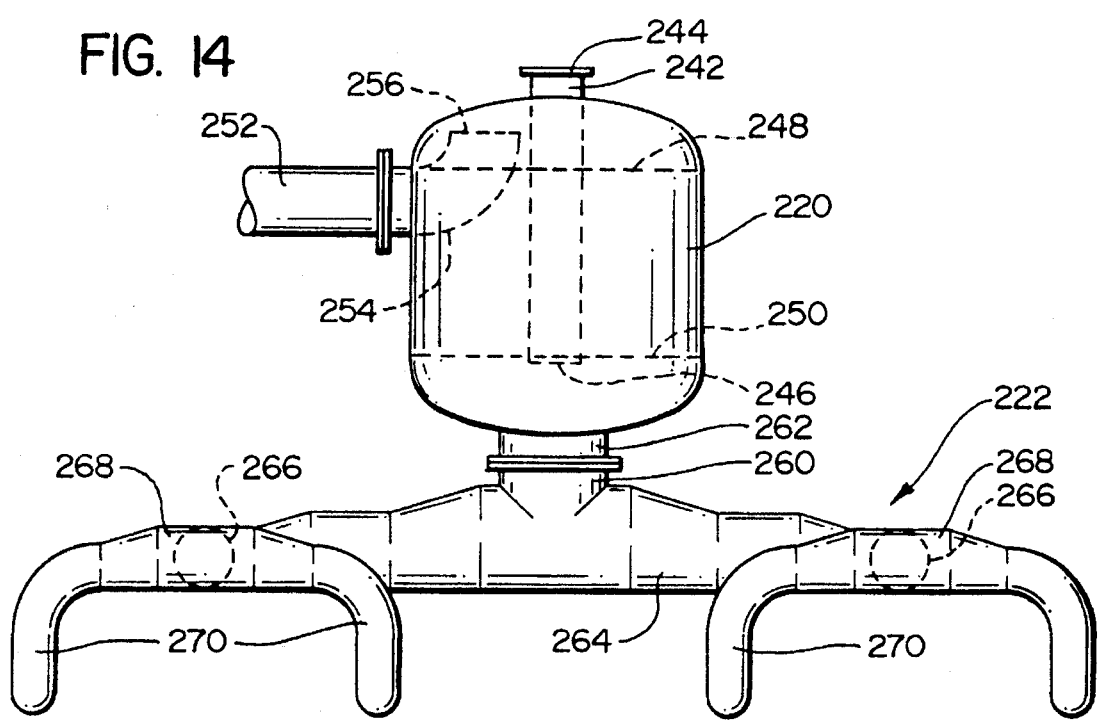
FIG. 14 is a side elevational view showing only the headbox and manifold assembly which provides the pulp for processing in this fourth embodiment.
Figure 15:
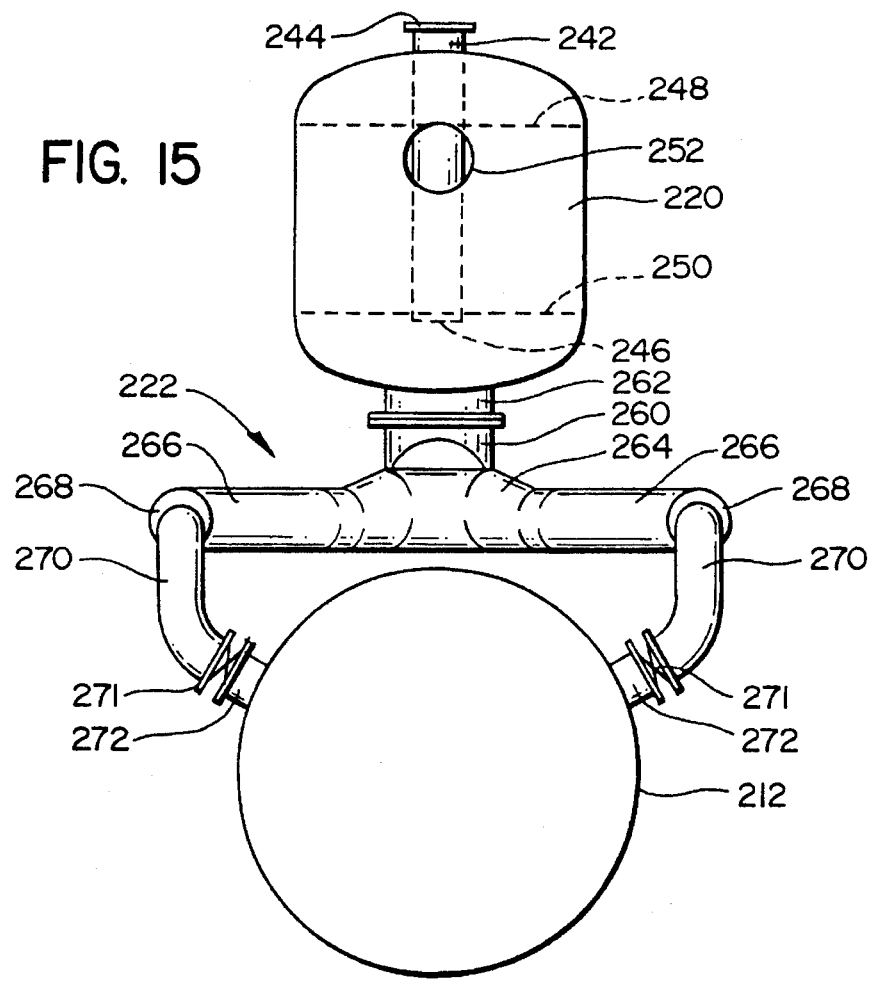
FIG. 15 is front elevational view of the headbox and manifold assembly of FIG. 14.
Figure 18:
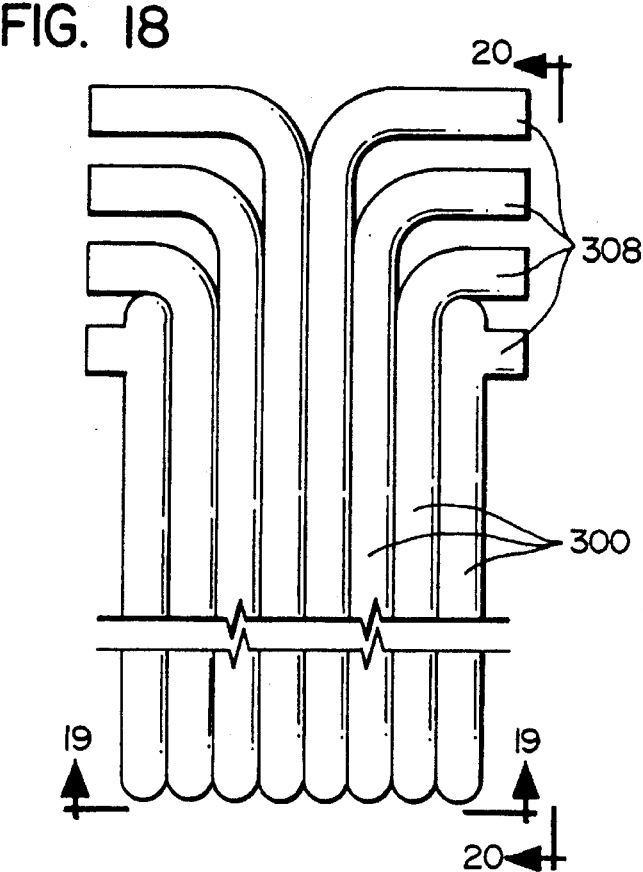
FIG. 18 is a top plan view showing only the recirculating tubes used in the fourth embodiment.
Figure 20:
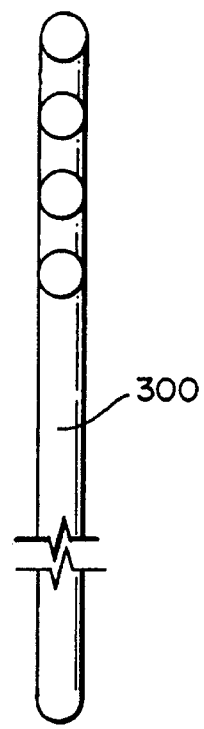
FIG. 20 is a side elevational view of the tubes of FIG. 18, taken at the location of line 20—20.
Figure 19:
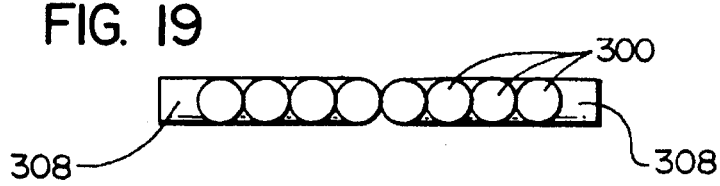
FIG. 19 is an end view of the tubes of FIG. 18, taken at line 19—19 of FIG. 18.

There now will be a more detailed description of this fourth embodiment. With reference to FIGS. 14 through 16, the headbox 220 is made in the form of a tank to contain pulp at a relatively high pressure which is moderately greater than the pressure within the main pressure vessel 212 due to it's hydrostatic head only. There is a pulp inlet pipe 242 having an upper inlet end 244 and a lower outlet end 246 located within, and at the lower part of, the headbox 220.

As will be described hereinafter, the pulp in the headbox 220 is discharged rather quickly in a batch into the processing area 218. During the operation of the apparatus 210, wood pulp is directed substantially continuously into the headbox 220 and reaches an upper level 248, and drops to a lower level 250 immediately after a batch discharge of the pulp. The lower end 246 of the pipe 242 is positioned moderately below the lower level 250 so that splashing of the incoming pulp slurry and a mixing with air is minimized.

There is a pressure equalizing conduit 252 which has an end elbow 254 that extends into the headbox 220 and has an end opening 256 that is located above the upper pulp level 248. This equalizing tube 252 connects to a fitting 258 that leads into the interior of the main pressure vessel 212. Thus, as the liquid level of the pulp slurry in the headbox 220 changes, gas is permitted to flow between the headbox 220 and the interior of the main pressure vessel 212 to equalize the pressure in the headbox 220 and the interior of the vessel 212.

The manifold system 222 has a central inlet 260 that connects to a lower outlet valve 262 of the headbox 220. This inlet 260 leads into a main trunk section 264 that extends forwardly and rearwardly from the inlet 260, with the forward and rear ends of the trunk section 264 leading into two branch lines 266, with each branch line 266 leading into a respective sub-branch 268. The sub-branches 268 each comprise lines 270 that are in turn connected through respective valves 271 to outlet members 272, each of which is positioned at the side of the pressure vessel 212 a little above the top of the enclosure frame 226.

More particularly, as can be seen in FIG. 11, the outlet end 274 of each of the members 272 is positioned moderately above the edge of the frame 226 so as to be slightly outward of the vertical inside surface 276 of the enclosure frame 226. Also, this outlet 274 is positioned laterally just a short distance outside of the lateral edges of the dewatering/ washing plate assembly 228. Thus, the pulp slurry is able to be discharged from the outlets 274 onto the table unit 224 within the area of the enclosure frame 226. The positioning of the outlet 274 permits the plate assembly 228 to be lowered downwardly to fit within the enclosure frame 226 and press against the pulp on top of the table unit 224. As can be seen in FIGS. 10, 12 and 13, the pulp outlets 274 are positioned in pairs on opposite sides of the pressure vessel 212 and spaced longitudinally at even intervals for proper distribution of the wood pulp onto the table unit 224.

The enclosure frame 226 comprises two longitudinally aligned side members 278 that extend along the lateral edge portions 280 of the belt 234, and two transverse members 282 that join the front and rear ends of the side members 278. These members 278 and 282 form a rectangular enclosure frame that defines the processing area 218.

As in the first embodiment, this enclosure frame 226 can be raised or lowered, and to accomplish this, there is provided a set of four hydraulic jacks 284. The upper surfaces 286 of the side and end members 278 and 282 are slanted downwardly and inwardly toward the processing area 218 so that if any of the wood pulp happens to splash onto the surface 286, it will tend to flow into the enclosed processing area 218.

The aforementioned table unit 224, as can be seen in FIG. 17, in addition to comprising the conveyor belt 234 further comprises a pressure differential plate assembly 288 comprising an upper plate 290 and a lower plate 292 which are joined and sealed at their edges by a perimeter strip 294. The upper and lower plates 290 and 292 each have a planar, rectangular configuration, and are spaced a short distance vertically from one another to provide an enclosed chamber 296 that extends through substantially the entire area of the plate assembly 288. These plates 290 and 292 extend beneath the entire processing area 218, and the side and end edges of these plates 290 and 292 are positioned just below the perimeter frame members 278 and 282.

The upper plate 290 is formed with a plurality of vertical through openings 298 positioned at equally spaced intervals over substantially the entire surface of the upper plate 290. The upper run of the conveying belt 234 rests on top of the plate 290 and the liquid from the pulp mat on the belt 234 flows through the openings 298 and into the chamber 296 between the plates 290 and 292. In this fourth embodiment, the spacers between the upper and lower plates 290 and 292 are conveniently provided in the form of round wires 299 that extend transversely (e.g. about ¼ inch in diameter) across the entire width of the table unit 224, with these wires 299 being spot welded in place at longitudinally spaced intervals along the entire length of the plate assembly 288. The wires 299 divide the chamber 296 into a plurality of transversely extending subchambers into which the openings 298 lead.

To provide the pressure differential in the table unit chamber 296 and also to remove the liquid collected in this chamber 296, there is provided a plurality of longitudinally extending tubes 300 that are positioned immediately below the lower plate 292 of the table unit 224. The lower plate 292 rests directly on the tubes 300 and each tube 300 is provided with a plurality of spaced through openings 304 that are aligned with and directly adjacent to corresponding openings 302 in the lower plate 292. The plate and tube perimeter edge portions around these openings 302 and 304 are joined by a circumferential weld 306 that forms a fluid tight and gas tight seal around each pair of aligned opening 302 and 304. These tubes 300 are spaced laterally across the processing area so that these openings 302 and 304 provide adequate flow paths throughout the entire area of the chamber 296.

The rear ends of the tubes 300 are (see FIG. 18) formed with right angle sections 308, each of which extends laterally and connects with a related outlet fitting 310 (see FIG. 11) mounted in the wall of the vessel 212. As shown in FIG. 11, each fitting 310 is connected through a line 312 to a related outlet valve 314 which leads through a line 316 to a selected one of several tanks (to be described hereinafter). Also, one line 312 that is connected to the tube 300 nearest the centerline of the main pressure vessel 212 is connected to an equalizing valve 318 which leads back into the interior of the vessel 212 through a line 320.

Each of the valves 314 and the valve 318 is operated in a manner similar to the valves 128 and 142 of the first embodiment to either create a pressure differential between the plate unit chamber 296 and the interior of the vessel 212, or to equalize the pressure in the chamber 296 and inside the vessel 312. Since this function is described in detail in the description of the first embodiment, this will not be repeated herein.

It is to be understood that the aligned openings 302 and 204 are positioned not only along the longitudinally aligned sections of the tubes 300, but also in the curved and right angle sections 308 so that these openings pairs 302–304 are positioned throughout substantially the entire surface of the table unit 226.

To describe in more detail the dewatering/washing plate assembly 228, this assembly comprises a main horizontal rectangular contact plate 322 having a peripheral side wall 324 extending entirely around the side edges of the plate 322. This plate 322 is lowered and raised by a set of four pistons 323, two of which are shown somewhat schematically in FIG. 11.

Figure 21:
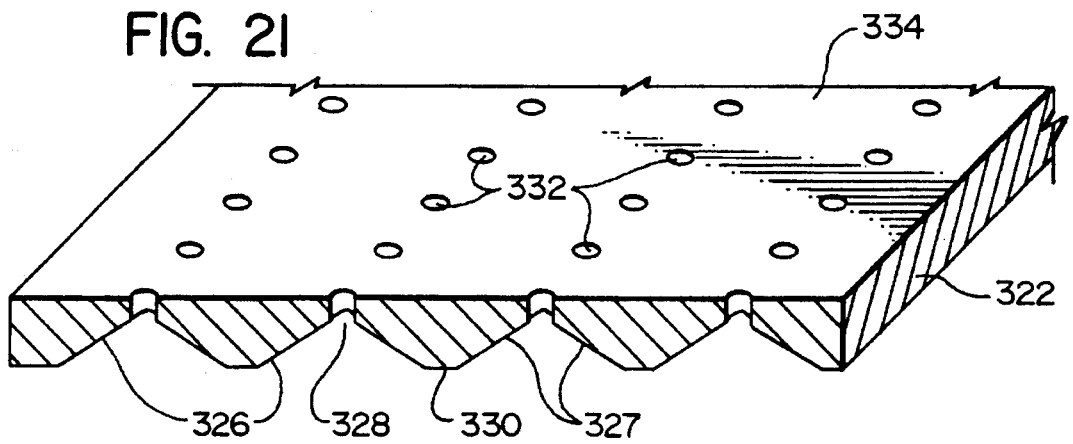
FIG. 21 is a perspective view of a portion of the contact plate of the fourth embodiment.

As can be seen in FIG. 21, the contact plate 22 is formed on its lower side with a plurality of longitudinally extending inverted "V" shaped grooves 326, each groove 326 being formed by soaking surfaces 327 that lead to an upper apex line or strip 328, and each pair of adjacent grooves forming a lower ridge line or strip 330 where the adjacent sides of adjacent grooves meet one another. The contact plate 322 is formed with a plurality of evenly spaced vertical through openings 332 extending along the length of each apex strip 328. Thus, when wash liquid is placed on the top surface 334 of the contact plate 322, the liquid flows through the openings 332 and into the grooves 326 at the location of the apex strips 328.

At this point the function of the dewatering/washing plate assembly will be described briefly, but there will be a more detailed description of its operation later herein. After the pulp slurry is initially discharged from the headbox 220 and manifold system 222 into the processing area 218 inside the enclosure frame 226 (which is in its lower position), the plate assembly 228 is lowered so that the contact plate 322 comes into contact with the upper surface of the pulp slurry. At the same time, there is a pressure differential between the interior of the vessel 212 and the pressure differential chamber 296 so that the pressure applied to the top of the contact plate 322 acts to push the plate 322 downwardly.

The pressure inside the vessel 212, in addition to pushing on the upper surface 334 of the plate 322, also exerts pressure through the openings 332 to bear directly against the pulp located at the opening 332. The pressure on top of the contact plate 322 causes the liquid in the pulp slurry to flow downwardly through the conveyor belt 234, through the plate openings 302–304 and into the pressure differential chamber 296 which is at this time at a low pressure level.

After the dewatering operation is completed, then the wash cycles begin. A first layer of wash liquid is deposited on top of the contact plate 322, and this wash liquid flows through the openings through the pulp mat to cause a liquid displacement washing operation. (This will be described in more detail later herein). At the completion of the washing cycles the valves 314 and 318 are operated to equalize the pressure in the pressure differential chamber 296 with the pressure in the vessel 212, the dewatering/washing plate unit 228 is raised, and the enclosure frame 226 is also raised. Then the conveying belt 234 can be moved to move the processed pulp mat through the discharge assembly 240 to a location outside of the pressure vessel 212.

Figure 28:
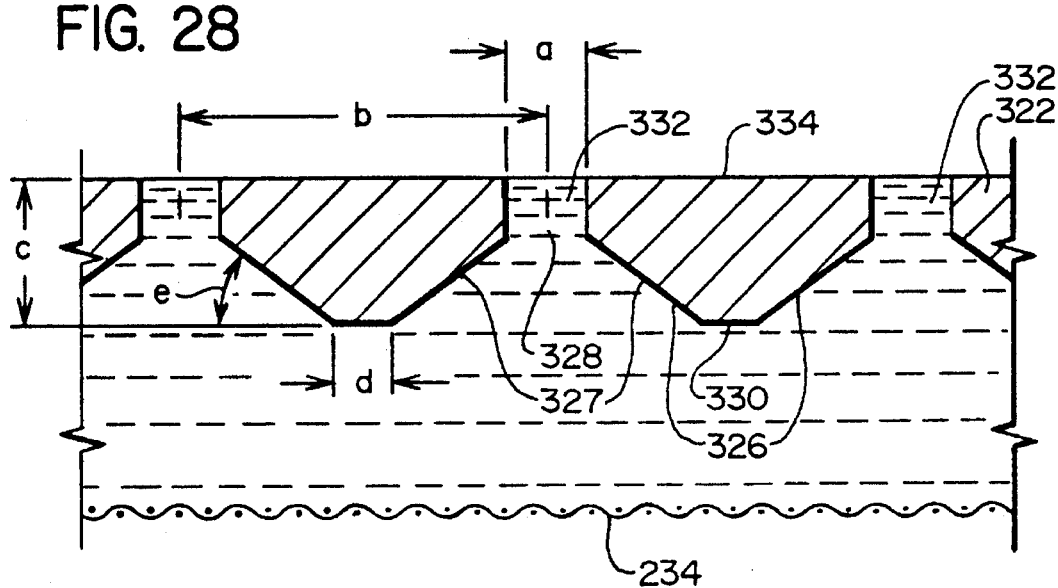
FIG. 28 is a transverse cross-sectional view of the contact plate.

To describe further the configuration and operation of the contact plate 322, reference is now made to FIG. 28. First, with regard to the dimension and configuration of the contact plate 322, in one embodiment which has been found to operate effectively, the diameter of the openings 332 (indicated at "a") were made as 1/16 inch. The lateral spacing of these openings 332 from one apex line 328 to another is ½ inch (indicated at "b" in FIG. 29) and the longitudinal spacing along each apex line 328 is ½ inch. The total depth dimension of the plate 322 (indicated at "c") is ¼ inch. The width of the apex line 330 (indicated at "d" in FIG. 29) is 1/16 inch. The angle of slant of the surfaces 327 relative to the horizontal was about 30° (indicated at "e" in FIG. 29).

It is to be understood, of course, that the dimensions and angles presented above are given simply by way of example of a contact plate 322 that has been found to work effectively, and these could be varied. With regard to the spacing and the diameter of the openings 332, the total cross-sectional area of these openings 332 should be great enough to permit an adequate rate of flow of the wash liquid through the openings 332 and into the pulp mat. Yet present analysis indicates that the size of the opening 332 should be sufficiently small and the spacing of the openings sufficiently great so that the contact plate 322 had adequate area to maintain its capability to enhance the dewatering operation.

It has been found that the use of this contact plate 322 in the present invention enhances both the dewatering and the washing operation. It was found experimentally that when the pulp slurry was dewatered to a certain consistency (in the order of about 20 to 25 percent) without use of the contact plate 322, further dewatering was not accomplished, because as the pressure differential continued to be applied, small air passageways (or steam passageways, if steam is present in the vessel 212) would form through the pulp mat, causing a blow-by condition.

On the other hand when the pressure plate 322 was used in the manner indicated above, it was found that the dewatering process could be continued until (for the same type of pulp slurry) the consistency of the pulp slurry was raised to as high as 25 to 35 percent before further effective dewatering could not be accomplished. The physical phenomena which account for this improvement in dewatering have not at this time been fully ascertained, but it can be hypothesized that the pressure above the plate 322 causing it to act as a pneumatic press contributes to these improved results. Further the formation of the plate with slanted surfaces forming the ridge and groove configuration could quite possibly have functional advantages. Further, while the openings 322 serve the function of permitting the wash water to flow through the plate 322 during the wash cycles, there is a possibility that these holes 332 permitting gaseous pressure to act directly against the pulp slurry surface could contribute advantageously. However, regardless of whether any of these hypothesis have any validity, it has been found experimentally that (as indicated above) the use of the contact plate 322 as described herein does clearly improve the dewatering operation.

Also, as indicated above, the use of the contact plate 322 enhances the wash operation. As will be disclosed later in this text in the description of the washing cycles, there is what is called a "dilution factor" where during each washing operation a certain portion of the black liquor that is removed from the pulp mat is diluted by fresh wash water in the system. If a higher percentage of the black liquor is removed during the dewatering process, then there is less black liquor that needs to be removed during the washing process. Thus, for the same dilution factor (which in the preferred embodiment of the present invention is one), there is less black liquor to be removed during the washing cycle and hence less wash water is needed for each cycle of displacement washing cycle.

Attention will now be directed toward the countercurrent liquid recirculating system of the present invention. In the following description, a three stage wash cycle is described. Further analysis has indicated that this could advantageously be a five stage wash cycle or possibly more than five wash cycles. However, for ease of explanation, only three wash cycles are described.

As indicated previously, there are three wash water discharge troughs 232 which are utilized to accomplish (in the present embodiment) three wash cycles. Each trough 232 has the configuration of half of a cylindrical shell, where the cylinder has been divided along a plane coinciding with the center axis of the cylinder. Each trough 232 is rotatably mounted about its center axis of curvature 336 in a manner that by rotating the trough 232 ninety degrees, the liquid in the trough can be discharged by gravity flow onto the contact plate 322. Each trough 332 is fed by a respective inlet pipe 338. Each pipe 338 extends through the pressure vessel and is connected to a respective feed tube 340.

Figure 22:
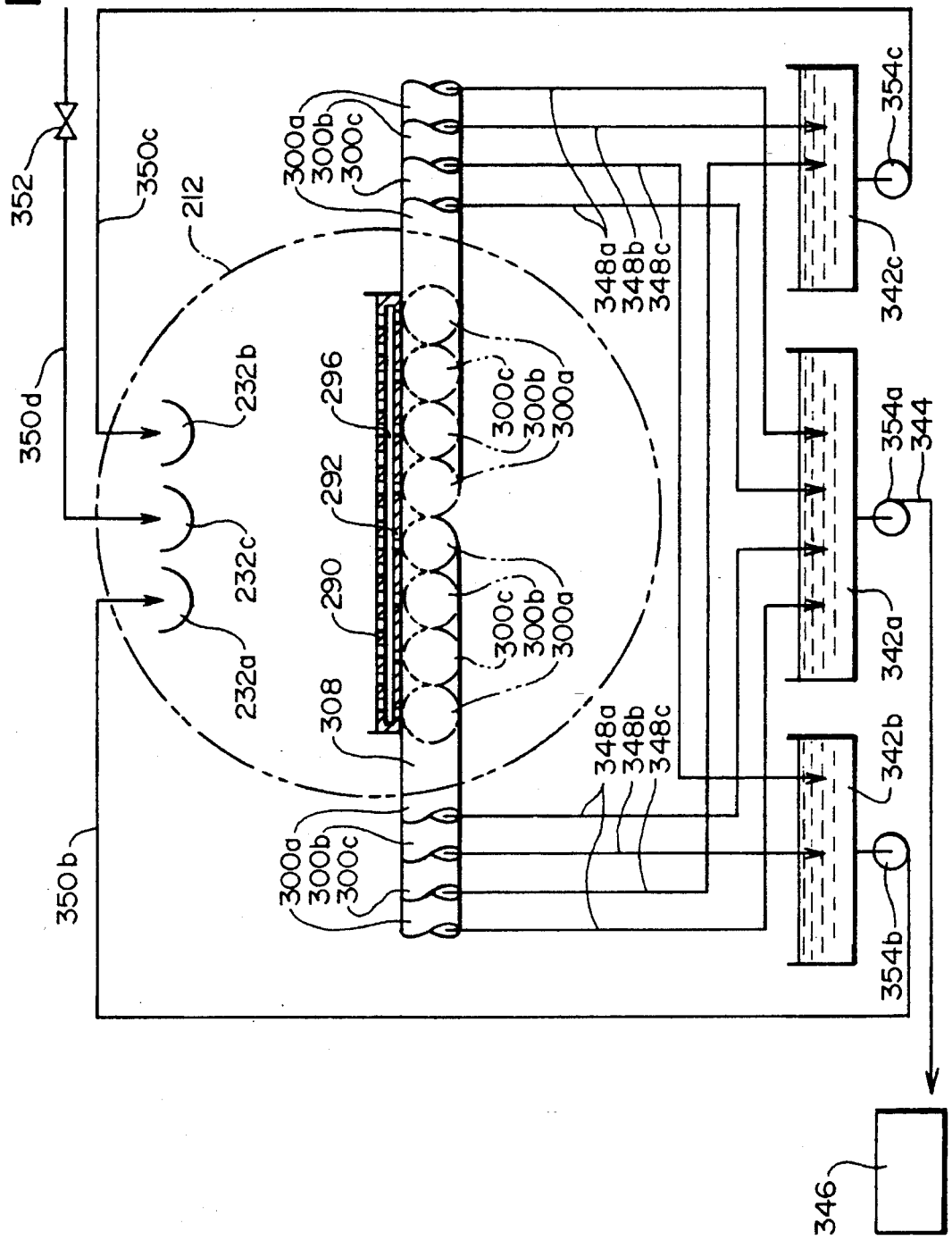
FIG. 22 is a somewhat schematic view of the liquid recirculating system of this fourth embodiment.

With reference to FIG. 22, there is shown somewhat schematically the liquid flow system of the present invention. There are three liquid receiving tanks 342a, 342b and 342c. The first tank 342a is a black liquor collection tank, and this receives the flow from the outermost and innermost sets of tubes 300a. The liquid from this black liquor tank 342a is discharged through a line 344 to an evaporating plant 346 or to some other location for further processing. The lines connecting the tubes 300a with the tank 342a are designated 348a.

The second liquid collection tank 342b receives the liquid flow from the collecting tubes 300b through the lines 348b. The flow from this tank 342b connects to a return line 350b which in turn leads to a related trough 232a. The third liquid collection tank 342c receives liquid from the collecting tubes 300c through the lines 348c. The flow from this tank 342c connects through a return line 350c to the trough 232b. There is a fresh water supply line 350d that connects through a valve 352 and leads into the third trough 232c. Recirculating pumps 354b and 354c are connected in the lines 350b and 350c, respectively.

With the liquid circulating system now having been described with reference to FIG. 22, let us now turn our attention to the operation of this liquid circulating system. As indicated previously, the process of the present invention is started by initially depositing a charge of wood pulp, having a consistency of, for example, one and one half to two and one half percent onto the conveying belt 234 at the table unit 224, where it immediately begins to flow laterally to form a layer. As soon as about one quarter to one half of the charge of the wood pulp is deposited on the table unit 224, the valves 214 connected to the collecting tubes 300a are opened (with the equalizing valve 318 being closed at this time) to connect these tubes 300a to a low pressure area, which in this instance would be the pressure at the black liquor collection tank 342a. This causes the pressure in the table unit chamber 296 to drop to create the pressure differential between the interior of the vessel 212 and the lower pressure in the table unit chamber 296, which in turn causes liquid to flow from the pulp slurry into the chamber 296, and thence into the collecting tubes 300a.

As indicated previously, as soon as the full charge of pulp has been deposited on the table unit 224, the dewatering/washing plate assembly 228 is immediately lowered so that the contact plate 322 comes into engagement with the upper surface of the pulp slurry. As described previously, the pressure differential between the interior vessel pressure above the plate and the lower pressure below causes the plate 322 to press down on the pulp slurry, and also gaseous pressure is exerted through the opening as 322. This enhances the movement of the black liquor that is in the pulp slurry out of the pulp, into the chamber 296 and thence into the tubes 300a.

Figure 23:
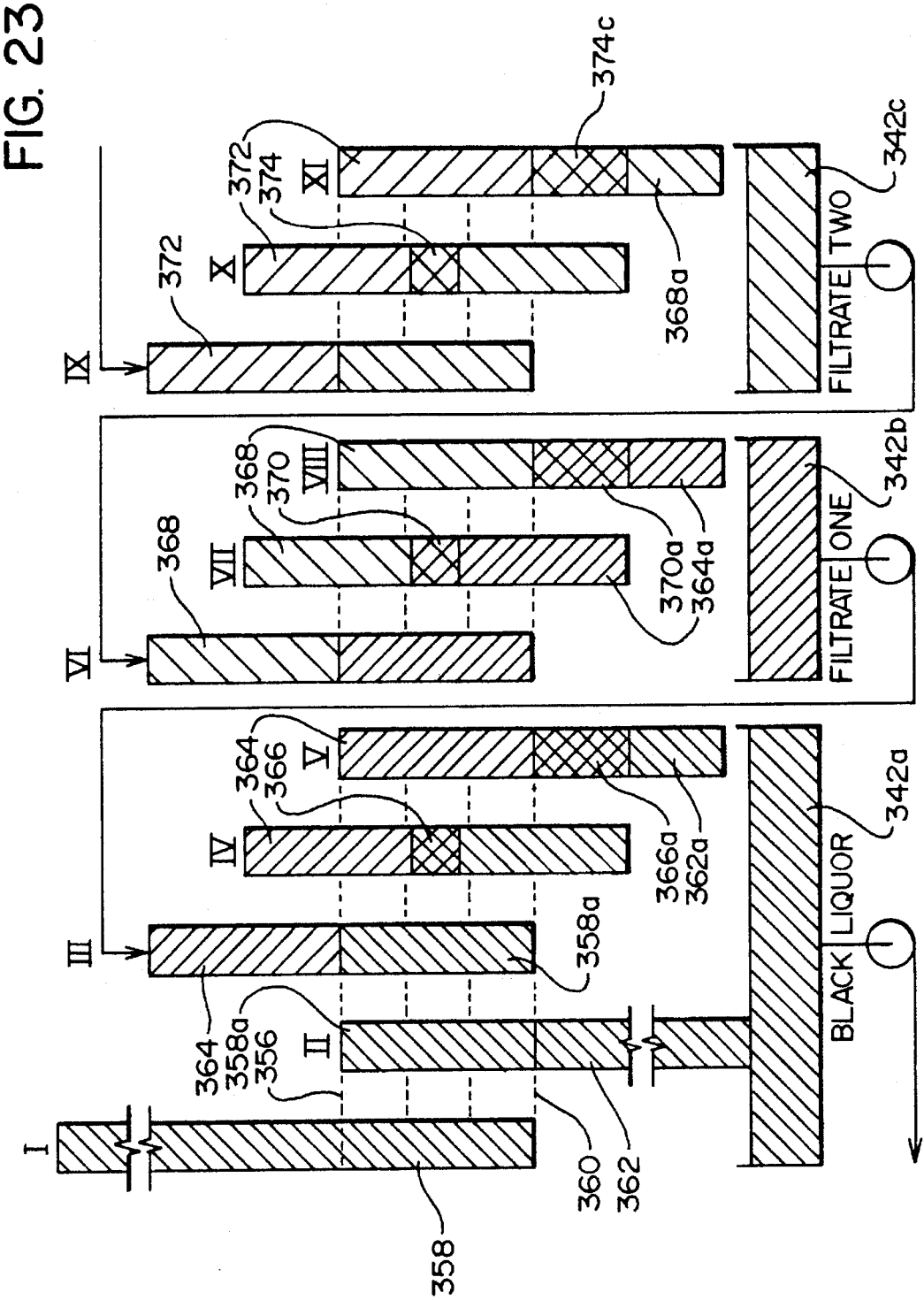
FIG. 23 is a schematic drawing, shown partially in the form of a graph, showing the manner in which the liquid recirculation takes place in the fourth embodiment.

Reference is now made to FIG. 23 to illustrate the sequence and operation of the dewatering and washing cycles. This initial dewatering step is illustrated in FIG. 23 at the very left end of the figure at Station I and II. To describe the format of FIG. 24, there is an upper line 256 which represents the location of the upper surface of the wood pulp mat 358a at the completion of the dewatering operation. The pulp slurry before dewatering is illustrated at 358 at Station I. The level 360 represents the lower surface of the dewatered pulp mat 358a which rests on the conveying belt 234. Therefore, the area above the line 356 represents liquid or pulp slurry above that level, while the area below the line 360 is the area at which the liquid removed from the wood pulp is located.

It can be seen at Station I at the very left end of FIG. 23 that the slurry 358 (with the black liquor comprising from ninety seven and one half percent to ninety eight and one half percent of the slurry) extends a substantial distance above the level 356. As the pressure differential is created, and also after the pressure of the contact plate is applied, this liquor is caused to be moved out of the pulp slurry, with this removed black liquor being indicated at 362. This black liquor is simply carried from the tubes 300a by the lines 348a into the black liquor tank 342a (See FIG. 22)

When this initial dewatering step (shown beginning at Station I) is just being completed (as indicated at Station II of FIG. 23), the trough 232a is rotated ninety degrees to deposit the wash liquid in trough 232a onto the top of the contact plate 322 (as indicated at 364 Station III of FIG. 23). It can be seen that this wash liquid in the trough 232a is received from the tank 342b (See FIG. 22). Since the pressure differential between the interior of the vessel 212 and the chamber 296 remains, the wash liquid indicated at 364 is caused to move into the pulp mat and begin a displacement washing cycle.

At this point, let us pause to analyze the content of the pulp mat and other factors and review briefly some of the subject matter covered above with reference to FIG. 22. Let us assume, for ease of calculation, that the consistency of the pulp mat after dewatering is twenty five percent. Thus, the pulp mat is seventy five percent liquid and twenty five percent pulp. The pulp mat indicated at 358a (which is the pulp mat immediately after dewatering is accomplished at Station II) is thus one quarter wood pulp and three quarters liquid, which liquid at this time is the original black liquor liquid. It can be seen that the area between the levels 356 and 360 has been marked off with two division lines, defining three equal increments in the dewatered pulp mat.

The deposit of wash liquid 364 from the tank 342b is, in this particular example, four units, as shown at Station III. At the same time there are (as indicated above) four volumetric units in the pulp mat at 358a, namely three units of black liquor and one unit of wood pulp.

At Station IV, the wash liquid of 364 has moved downwardly part way into the pulp mat, and it can be seen that there is a mixing area developing at 366, where some of the wash liquid 364 is mixing with some of the black liquor (say one half unit of the four added wash liquid units). By the time four units of the wash liquid 364 have moved into the mat (as shown at Station V in FIG. 24), it can he seen that the last portion of the black liquor 362 in the mixing area 366 has been pushed through the mat to the area 366a below the mat, and the wash liquid 364 entirely permeates the wood pulp mat. During this time, the mixed liquid at 366a and the last portion of the black liquor indicated at 362a are deposited into the black liquor tank 342a.

At this point, attention should be called to the fact that the mixed portion of the liquid at 366a that is deposited into the black liquor tanks is made up of one unit of the original black liquor and one unit of the wash water 264. This one unit of wash water is what is in a sense "diluted" to the black liquor tank 342a as a result of the three washing cycles, the first of which was described immediately above. As will become more apparent as we continue with this description, this one unit of "diluting" liquid is replaced by one unit of fresh water. At the same time, there is one unit of wood pulp that is being displacement washed. Thus, this gives a dilution factor of one (i.e. one part pure water to one part of wood pulp that is displacement washed).

To continue with our description of the process, when the process has reached the stage shown in Station V, where the mixed liquid portion 366a has been moved through the wood pulp mat, then the valves 314 leading from the tubes 300a are closed, and the two valves 314 which connect to the tubes 300b are opened. At this point the trough 232b is rotated ninety degrees and the next four units of wash liquid 368 from filtrate tank 342b is deposited on the contact plate 322. The liquid that is now being removed from the wood pulp is directed to the collection tank 342b. (In FIG. 24, this is called the "Filtrate One" tank). The reason for this is that this filtrate from the tank 342b is (as will be described shortly hereinafter) countercurrently circulated so as to be used as the wash liquid at 364 for the first wash cycle. The timing of this operation of the valves 314 to change flow from going to the black liquor thank 342a to the filtrate one tank 342b depends on how quickly the black liquor liquid has flowed from the low pressure chamber 296 into the conduits 300a. As the last of the black liquor liquid leaves the pulp mat 358a, there will still be some black liquor in the differential pressure chamber 296 that desirably should be directed into the tubes 300a. When this is substantially completed, then the valves 214 are operated (as indicated above) to direct further flow into the tubes 300b and thence to the filtrate one tank 342b.

As the second wash cycle progresses from Station VI to Station VIII, it can be seen that four more units of the second wash liquid 368 have moved into the pulp mat, while the remaining three units of the first wash liquid 364 inside the pulp mat and one unit of the second wash liquid 368 have moved out of the mat into the collection tank 342b. The removed second wash liquid is indicated at 364a, and the removed mixed liquid is indicated at 370a. None of these units of the second wash liquid 364a have been diluted into the black liquor liquid tank 342a. As soon as the condition at Station VIII is reached then the valves 314 leading from the tubes 300b are closed, and the two valves 314 which connect to the tubes 300c are opened and the third trough 232c is tilted so as to dump clean wash water onto the contact plate 322, this wash water being designated 372. It can be seen from FIG. 24 that this wash water 372 is coming from the fresh water supply line 350d. Again, as indicated earlier with regard to switching the valves 314 to cause flow to change from going to tubes 300a to tubes 300b, the timing will depend on how quickly the flow of the second wash liquid 364a flows from the low pressure chamber 296. After the valves 314 are so operated, the liquid that is then being removed from the wood pulp is directed to the collection tank 342c (called the "Filtrate Two" tank ).

To begin the third wash cycle illustrated in Station IX to Station XI it can be seen that four units of the third wash liquid 372 are deposited on the contact plate 322 and are moved by pressure into the pulp mat. The remaining three units of the second wash liquid 368 inside the pulp mat and one unit of this third (fresh water) wash liquid 372 are moved out of the pulp mat into the collection tank 342c (filtrate two tank), and these are designated 368a and 374a, respectively.

This third wash cycle is continued until the four units of fresh water 272 have moved totally into the pulp mat 358, and the mixing zone 374 together with the last portion of the water 268 have moved totally through the mat. Now the valves 314 connected to the tubes 300c are closed. At this time, the valve 318 is opened so as to equalize the pressure in the pressure differential chamber 296 and in the vessel 212 so that there is no further pressure differential. At this time, the dewatering cycle and the three wash cycles have been completed, and the pulp mat 358 is ready to be removed from the processing area 216 and out of the pressure vessel 212.

In the event that more than three wash cycles are employed, then the apparatus 210 would be modified accordingly. For example, for each wash cycle added there would be an additional filtrate tank 342 in the countercurrent recycling system. Also other modifications could be made. For example, only two troughs 232 could be used (or possibly two sets of two troughs 232). Then after one trough 232 discharges its wash liquid, it could be filled with the wash liquid from another filtrate tank 342. Two of the troughs 232 could be used simultaneously to start one wash cycle, with the two troughs being positioned on opposite sides of the interior of the vessel 212. Or some liquid feed means could be used other than the troughs 232.

In reviewing the entire process recited above with reference to FIG. 23, it is apparent that the wash water collected in the Filtrate One tank contains the greatest amount of impurities, and that contained in the Filtrate Two tank a lesser amount of impurities, with the fresh water obviously containing the least amount of impurities. Analysis will indicate that as this process continues with hatch after batch of wood pulp slurry being processed, an operating balance will be achieved. More specifically, the purity of the liquid in the Filtrate One and Filtrate Two tanks 342b and 342c will remain substantially constant. The reason for this is that at the completion of every set of three washing cycles, one segment of fresh water has been added to the Filtrate Two tank 342c, and one unit from the Filtrate Two tank has been passed forward to the Filtrate One tank. The reason for this is that the liquid from each mixing zone is passed forward in the system toward the black liquor tank and evaporator plant.

The next step is to remove the processed pulp mat 358 from the processing area 218 and also to a location outside of the main pressure vessel 212. To accomplish this, first the enclosure frame 226 and the dewatering/washing plate assembly 228 are both raised, and the belt 234 is moved in a forward direction to carry the processed pulp mat 258 to the discharge assembly 240.

Figure 24:
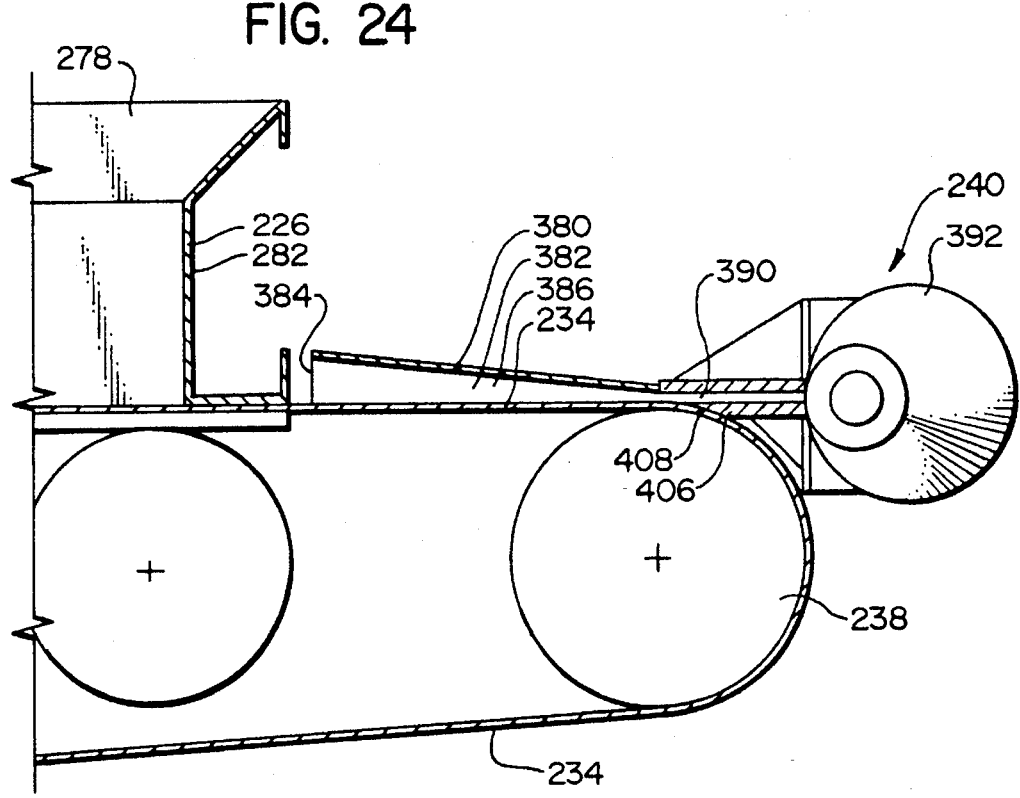
FIG. 24 is a side elevational view of the pulp discharge assembly of the fourth embodiment.
Figure 25:
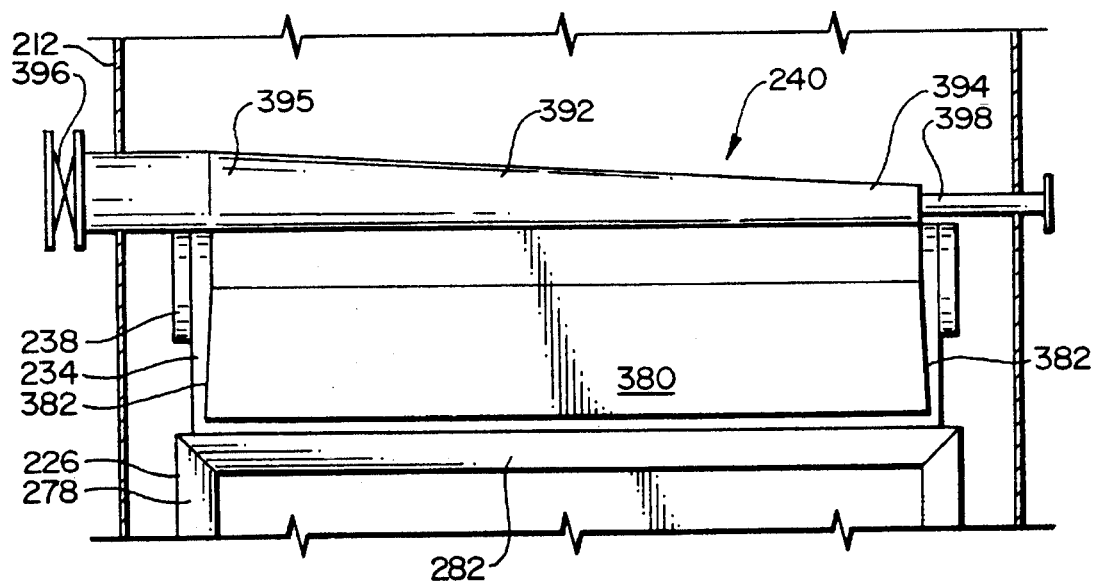
FIG. 25 is a top elevational view of the discharge assembly of FIG. 27.
Figure 26:
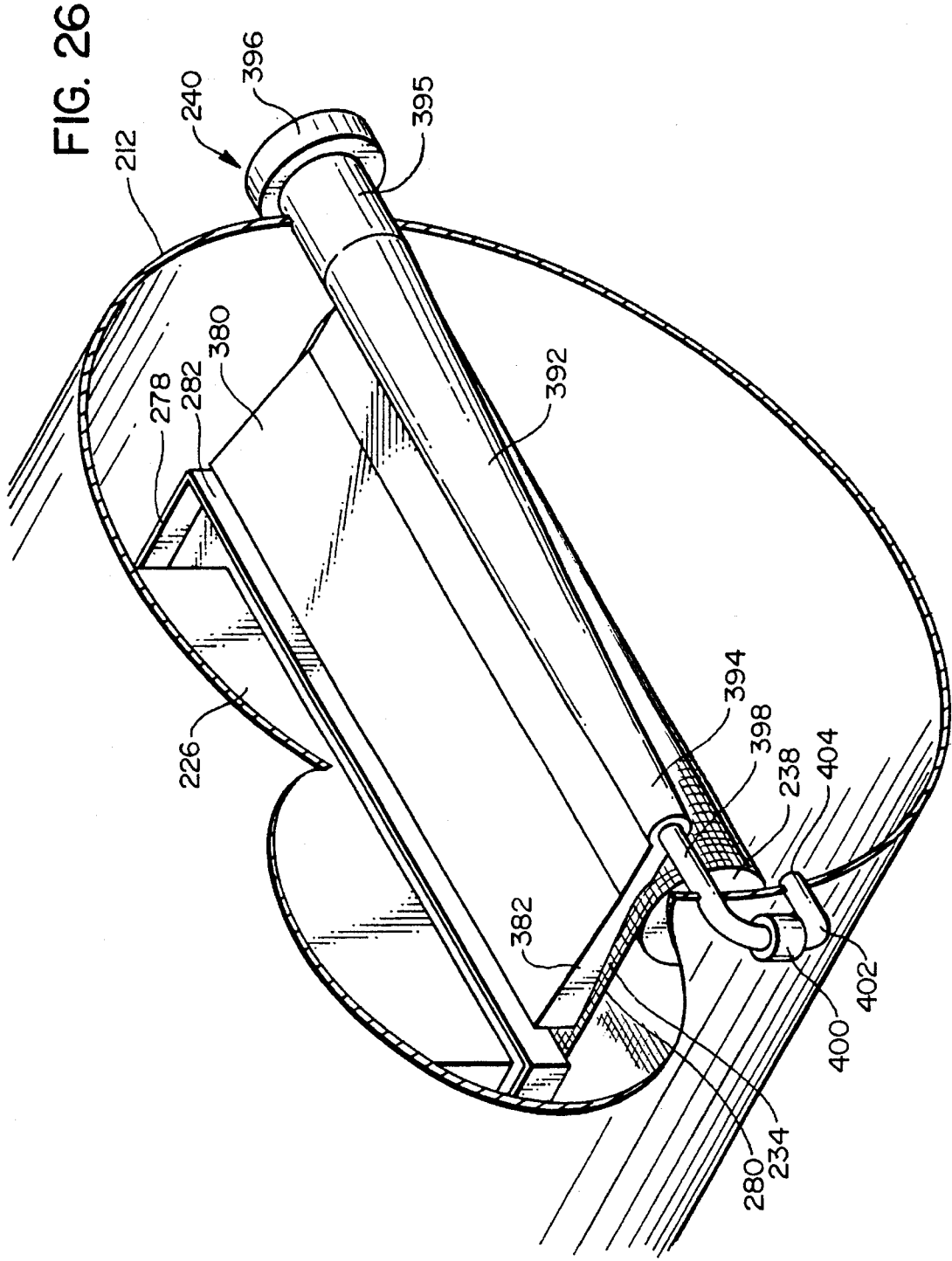
FIG. 26 is an isometric view of the discharge assembly as shown in FIGS. 24 through 25.
Figure 27:
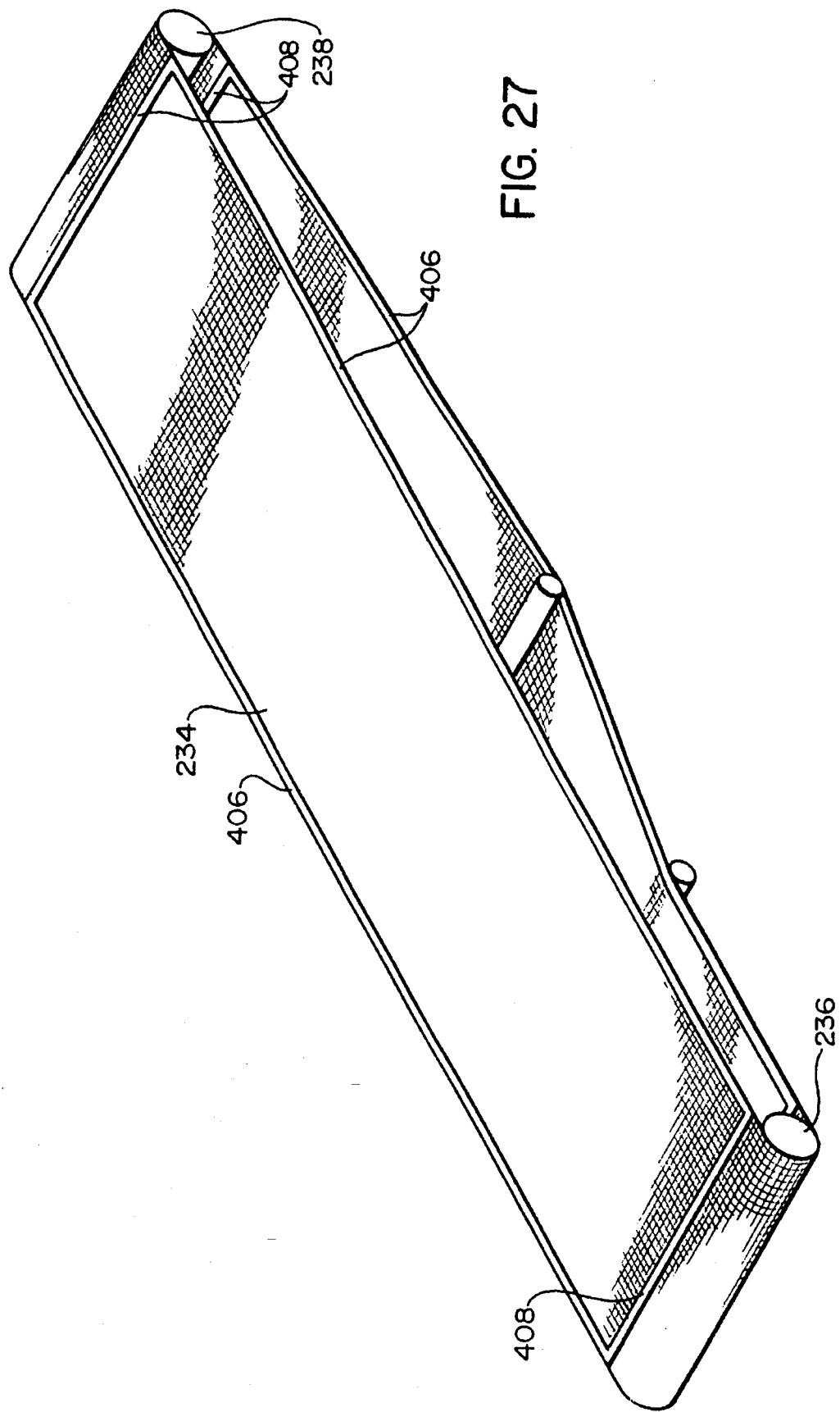
FIG. 27 is an isometric view of the conveying belt of the fourth embodiment, and showing also the rollers associated therewith.

As can be seen in FIGS. 24, 25 and 26 the discharge assembly 240 comprises a guide plate 380 that has two side plates 382 that defines with the underlying belt 234 an inlet 384 which has a height dimension moderately greater than the thickness dimension of the processed pulp 358. The plate 380 slopes very moderately downwardly in a forward direction so that the passageway 386 leading from the inlet 384 and defined by the plates 380 and 382 and the upper run of the belt 234 tapers in thickness in a forward direction. The effect of this is that the pulp layer becomes squeezed to a moderate extent in the passageway 386 as it progresses forwardly.

The effect of so moving the pulp into the passageway 386 is to substantially close the rear end of the passageway 286 so that very little of the gas (e.g. air or steam) within the vessel 212 passes through the passageway 386. The passageway 386 at its rear end terminates in a discharge passageway portion 390 having a substantially constant cross-sectional area. This forward passageway section 390 leads into a discharge chamber defined by a discharge housing 392. This discharge housing 392 has a generally frusto-conical configuration, having at its side a right side 394 a smaller cross-sectional area and extending laterally through the opposite side of the vessel 212 where it has a more expanded area 395. At the outlet end, there is an outlet valve 396. There is a gas pressure line 398 leading into the right end 394, and this line 398 connects through a valve 400 to an elbow 402 that leads into the interior of the pressure vessel 212 at 404.

There is a doctor blade 406 having a forward edge 408 that removes the pulp mat from the belt 234. This doctor blade 406 defines the lower portion of the aforementioned passageway 390.

In operation, when the dewatering and washing cycle has been completed, the belt 234 is moved to in turn move the forward edge of the pulp mat through the entryway 384 and into the passageway 386. When the pulp mat has moved forward to the extent that it substantially encloses the passageway 386, then the valve 396 is opened, thus reducing the pressure in the discharge housing 392 to atmospheric. This enhances the movement of the pulp mat toward the discharge housing 392. As the pulp mat begins to be discharged from the forward passageway portion 390 into the housing 392, then the valve 400 can be selectively opened to cause the high pressure gas in the vessel 212 to pass into the inlet 404, through the valve 400 and into the housing 392 to assist in blowing the pulp material outwardly from the housing 392 and through the valve 396. When the pulp mat has been discharged, then these valves 400 and 396 are closed.

To further describe the conveying belt 234, reference is made to FIG. 28. It can be seen that the belt 234 has two edge strip portions 406 and two transverse strip portions 408 that are made imperforate in much the same manner as the belt shown in FIG. 9 These strips 306 and 408 engage the lower edge portions of the enclosure frame 226 to make a seal. A second set of strips 406 and 408 are also formed at the section of the belt which in FIG. 29 is at the lower run. Thus after the dewatered and washed pulp mat is discharged from the upper run of the belt 234, the lower fun moves to become the upper run of the belt for a second dewatering and washing operation.

As indicated previously, one of the desirable features of the present invention is that with the entire process being performed within the pressurized vessel 212 (and in the first embodiment in the vessel 12), it becomes more practical to operate with much higher pressure differential across the pulp mat. This leads to a number of advantages.

First, with a greater pressure differential being applied across the pulp slurry and later the pulp mat, the processing time is greatly reduced. For example, it has been found experimentally, that during the dewatering operation, if a pulp slurry of between one and one half percent to two and one half percent consistency is deposited on the table assembly 224 in the processing area 218 to a depth of about 6 inches, when a pressure differential of about 100 PSI is applied, and the contact plate 322 utilized to press against the pulp slurry, the dewatering is accomplished as quickly as in about 8 seconds.

Also, the washing operations can be accomplished more quickly. For example, with a dewatered pulp mat of about ½ inch thickness that has a consistency of about 20 percent, with the wash liquid being deposited on top of the plate 322, from the time the pressure differential is applied to the time a single wash cycle is completed, the elapsed time is between about 1 to 3 seconds.

Another advantage is that with the relatively high pressure in the vessel 212 (and also in the vessel 12 of the first embodiment), the temperatures at which the dewatering and washing are accomplished can be raised. One advantage of this is that the viscosity of the black liquor decreases as the temperature increases. Thus, the black liquor flows more easily through the pulp slurry and pulp mat, and both the dewatering operation and the washing operation can be accomplished more easily. Also, with regard to the washing operation, it is believed that the higher temperature of the wash water increases the effectiveness of the washing operation.

A further advantage of operating at high pressures within the vessels 212 (or the vessel 12 of the first embodiment) is that there can (relative to certain operations) be a savings in the energy used in the overall wood pulp manufacturing process. For example, before the pulp slurry is delivered to the apparatus of the present invention, it is in a digester where it is being processed at very high temperatures and pressures. If this wood pulp is then, for example, moved to a dewatering or washing area where the pressure and temperature are much lower, then much of the heat energy in this wood pulp is simply dissipated to the surrounding atmosphere, largely in the form of the high temperature water simply flashing off as steam. On the other hand, if the pulp slurry is moved from the digester, while maintaining this high pressure and temperature, to the pressure vessel 212 (or the vessel 12 in the first embodiment), less the heat energy (heat energy) is lost.

Further, after dewatering and washing, the black liquor is commonly delivered to an evaporating area. In the usual wood pulp manufacturing operation, it is necessary to evaporate the black liquor to a higher dry solid content to be able to burn it in the recovery boiler to recover chemicals that are reused.

With regard to the operating pressures and temperatures utilized in the present invention, to the best knowledge of the applicant herein, the highest pressure differentials used in the commercially practical prior art dewatering and/or washing operations is no greater than 10 PSI. In the present invention, the pressure differential applied is greater than 10 PSI. Beneficial results can be obtained to some degree in the present invention with pressures in the vessel 12 or 212 as high as, for example, 20 PSI or 50 PSI. However, more desirably, the pressures in the vessel 12 or 212 would be at at least as high as 100 PSI or 150 PSI. It is surmised that pressures as high as 300 PSI could also be used, or even pressures up as high as 500 PSI. This would possibly be more desirable particularly when the wood pulp and removed liquid already is at a rather high temperature and pressure at the previous processing location (e.g. a digester), and the pulp slurry can be moved into the apparatus of the present Invention without loss of that heat energy already in the pulp slurry.

With the foregoing detailed description having been completed, the overall operations of this fourth embodiment will now be summarized. Initially, the vessel 212 is pressurized to an above atmospheric operating pressure. Generally, the pressurized gaseous medium within the vessel 212 is air, steam, or a combination of air and steam. Also, desirably the temperature within the vessel 212 is maintained at a level above ambient temperature, this depending to some extent on operating pressures and other factors.

A pulp slurry is directed through the pipe inlet 244 to flow into the headbox 220. Until the headbox 220 is filled to an adequate level (i.e. to the level 248 as shown herein). Also the enclosure frame 226 is lowered onto the table unit 224 and the plate assembly 228 remains in its raised position. Then the valves 271 in the manifold outlet members 272 are opened to cause the pulp slurry in the headbox 220 to flow through the manifold 222 and through the outlets 274 onto the portion of the upper run of the conveyor belt 234 that is within the enclosure frame 226. The pulp slurry typically would have a consistency of one and one half to two and one half percent, and at that consistency it would readily flow across the table unit to form a substantially uniform layer within the enclosure frame 226.

While the pulp slurry is flowing onto the table unit 224, as soon as this pulp slurry has reached a sufficient depth so that the dewatering process can begin (typically in the order of 1 to 2 inch), the valve 314 that leads from the conduits 300a is opened to lower the pressure in the variable pressure chamber 296 in the plate assembly 288. At the same time, the equalizing valve 18 is closed (or remains closed). This pressure differential causes the liquid (i.e. black liquor) in the pulp slurry to begin flowing through the foraminous conveying belt 234 and through the openings 298 in the plate 290, thence into the chamber 296, from which the liquid flows through the openings 304 that lead into the conduits 300a. These conduits 300a in turn direct the black liquor into the tank 342a. Typically the pressure at the tank 342a would be atmospheric, and depending upon the height of the liquid level in the tank 342, relative to the height of the pressure differential chamber 296 the pressure differential across the pulp mat would be close to the pressure difference between the pressure vessel 212 and atmospheric pressure. This can vary, depending on the circumstances.

As soon as the first batch of pulp slurry has been completely discharged through the openings 274 into the processing area 218, then the contact plate 322 is promptly lowered onto the upper surface of the pulp slurry. As described in more detail previously herein, the gaseous pressure above the plate 322 pushes downwardly on the plate 222 to cause it to press against the pulp slurry and assist in the dewatering operation. At the same time, gaseous pressure acts through the openings 332 directly against the pulp slurry. This pressure differential is maintained until the desired amount of black liquor has been removed from the pulp slurry to form the pulp mat. Typically, the dewatering would be completed when the consistency of the pulp mat has reached a level of between about 15 to 35 percent. In general, it would be desirable to obtain as high a consistency as possible, but this can vary, depending upon various factors.

As soon as the dewatering step is completed, then the trough 232a is tipped to deposit the first batch of Filtrate one wash liquid onto the top surface 334 of the contact plate 322. The wash liquid flows through the plate openings 332 and into the pulp mat to cause displacement washing so that the black liquor remaining in the pulp mat is moved out of the pulp mat and into the pressure differential chamber 296. At such time as the wash liquid has moved completely into the pulp mat and is flowing into the chamber 296, then the valves 314 leading from the tubes 300a are closed off, and the valves 314 leading from the conduits 300b are opened to receive the wash liquid. The washing cycles continue in the manner described earlier herein with reference to FIG. 24. Since the description of these wash cycles has been dealt with in detail previously herein, these will not be described in any detail in this summary.

When the final wash cycle is completed, then both the enclosure frame 226 and the contact plate 322 are raised, the valves 314 that are open are then closed and the equalizing valve 318 is opened to raise the pressure in the table unit chamber 296 to the level in the vessel 212. With the pressure being so equalized, the only force bearing on the upper surface of the conveyor belt 234 is the weight of the pulp mat. Then the conveyor belt 234 is moved to cause the pulp mat to move into the discharge assembly 240 Then the discharge assembly is operated as described previously herein to move the pulp mat out of the pressure chamber of the vessel 212.

it is to be understood, of course, that various modifications could be made on the present invention without departing from the basic teachings thereof. For example, while the table unit 224 is provided with an endless conveyor belt 234 to remove the pulp material from the processing area 218, within the broader scope of the present invention, other pulp removal means could be used. For example, after the enclosure frame 226 and the plate assembly 228 have been raised, and after the pressure in the variable pressure chamber 296 has been equalized within the vessel 12 or 212, then a scope-like member or an arm could be moved across the upper surface of the table unit 224 to remove the pulp mat that has been formed. Further, other mechanical devices or removal techniques could be used to accomplish this purpose.

Also, by way of further example, there could be yet more processing stations or areas. Further, it is conceivable that other operations could be performed at the processing area 218, in addition to the dewatering and washing.

Further, it is to be recognized that the above possible modifications are given by way of example, and yet other possibly modifications could be made without departing from the basic teachings of the present invention.

What is claimed:

1. An apparatus for removing liquid from pulp slurry comprising:

a. a pressure vessel defining a pressure chamber;

b. means to pressurize said pressure chamber to a pressure level above atmospheric pressure;

c. a table assembly which has a perforate support surface means for receiving the pulp slurry thereon, said table assembly being arranged to contain said pulp slurry in a processing area that is located over the support surface means, said support surface means being exposed to pressure in said pressure chamber;

d. infeed means to direct a portion of pulp slurry under pressure into said chamber and onto said surface as a layer, with said layer in said processing area being at a stationary location relative to said support surface;

e. said table assembly defining a pressure differential chamber below said support surface;

f. pressure differential means to create a pressure differential between said pressure differential chamber and said pressure chamber with said pulp slurry on said surface means to cause liquid to flow from said pulp slurry to said pressure differential chamber, and also to reduce said pressure differential;

g. removal means to remove said pulp slurry from said pressure vessel after liquid removal therefrom and after said pressure differential is reduced, while maintaining above atmospheric pressure in said pressure chamber;

h. said pressure chamber being arranged to extend both above and below said table assembly.

2. The apparatus as recited in claim 1, wherein said table assembly comprises a table unit that has an upper perforate plate defining said support surface and having opening means therein, and a lower plate means defining said pressure differential chamber.

3. The apparatus as recited in claim 1, wherein said apparatus further comprises enclosure frame means to contain said slurry in said processing area.

4. The apparatus as recited in claim 3, wherein said enclosure frame means extends around said processing area to contain said pulp slurry in said processing area, and at least a section of said enclosure frame means is moveable between a first position adjacent to said perforate support surface means so as to contain said layer, and a second position where at least said section of said enclosure frame means is spaced from said support surface means, said assembly further comprising a frame actuating means to move at least said frame section between said first and second position.

5. The apparatus as recited in claim 1, wherein said removal means comprises a conveying belt means extending beneath said processing area.

6. The apparatus as recited in claim 5, wherein said conveying belt means comprises upper, lower and end belt portions, all of which are positioned entirely within said pressure chamber.

7. The apparatus as recited in claim 1, wherein said apparatus has two processing area portions, namely a first dewatering area and a second washing area, said apparatus further comprising frame enclosure means comprising a first mat forming enclosing section and a second washing enclosure section, said mat forming enclosure section defining said dewatering area, and said second washing enclosure section defining said washing area.

8. The apparatus as recited in claim 1, wherein said pressure differential means is arranged to create a pressure differential between said pressure chamber and said pressure differential chamber greater than about 10 PSI.

9. The apparatus as recited in claim 8, wherein said pressure differential means is arranged to create a pressure differential between said pressure chamber and said pressure differential chamber is at least as great as about 100 PSI.

10. A method to accomplish liquid removal from a pulp slurry, said method comprising:
   a. moving the slurry into an above atmospheric pressure chamber in a manner to form said slurry as a layer at a processing area over a foraminous support surface means of a table assembly positioned in said pressure chamber;
   b. creating a lower pressure level, relative to the pressure level in said pressure chamber, in a pressure differential chamber provided in said table assembly, with said pressure differential chamber extending beneath said processing area, to create a pressure differential with said layer being stationary at said processing area to cause said liquid removal from said layer;
   c. creating a higher pressure level in said pressure differential chamber relative to the pressure level in said pressure chamber subsequent to said liquid removal to reduce said pressure differential;
   d. removing said layer from said processing area and from said pressure chamber, while maintaining above atmospheric pressure in said pressure chamber.

11. The method as recited in claim 10, further comprising creating the greater pressure differential between said pressure chamber and said pressure differential chamber is greater than about 10 PSI.

12. The method as recited in claim 11, further comprising creating the greater pressure differential between said pressure chamber and said pressure differential chamber at least as great as about 100 PSI.

13. The method as recited in claim 10, wherein said higher pressure level in said pressure differential chamber is created by raising the pressure level in the pressure differential chamber to a level substantially equal to the above atmospheric pressure level in the pressure chamber.

14. The method as recited in claim 13, wherein creating the higher pressure level in said pressure differential chamber is accomplished by opening said pressure differential chamber to said pressure chamber to thus substantially equalize pressure between said pressure chamber and said pressure differential chamber.

15. The method as recited in claim 14, wherein the lower pressure level in the pressure differential chamber is created by opening said pressure differential chamber to a lower pressure area that is exterior of said pressure chamber and closing said pressure differential chamber to said pressure chamber.

16. The method as recited in claim 10, wherein said above atmospheric pressure chamber is defined by a pressure vessel having a containing wall enclosing said pressure chamber, and pressure in said pressure differential chamber is increased by opening said pressure differential chamber to the pressure chamber defined by said pressure vessel, and pressure in said pressure differential chamber is reduced by opening said pressure differential chamber to a lower pressure area outside of said pressure vessel, while isolating said pressure differential chamber from the pressure chamber defined by the pressure vessel.

17. The method as recited in claim 10, further comprising defining said processing area by positioning an enclosure frame means on said foraminous support surface means and moving said slurry to a location with said enclosure within frame means.

18. The method as recited in claim 17, further comprising positioning a contact plate means onto said slurry at said processing area and causing said contact plate means to press downwardly on said slurry to enhance liquid removal.

19. The method as recited in claim 17, further comprising moving at least a portion of said enclosure frame means relative to said support surface means to open said processing area and permit removal of said layer after said liquid removal.

20. The method as recited in claim 19, wherein there is a foraminous conveyor belt means extending along said processing area, and removal of said layer from said processing area is accomplished by moving said conveyor belt means after at least a portion of said frame containment means has been moved to open said processing area.

21. The method as recited in claim 20, wherein said conveyor belt means is positioned entirely within said pressure chamber, said layer is removed from said conveyor belt means and into a confining passageway means, and said passageway means is caused to be in communication with a lower pressure area outside of said pressure chamber to cause said layer to be moved through said passageway means in substantial sealing relationship to maintain pressure in said pressure chamber.

22. The method as recited in claim 10, further comprising positioning a contact plate means onto said slurry at said processing area and causing said contact plate means to press downwardly on said slurry to enhance liquid removal.

23. The method as recited in claim 22, wherein said contact plate means has openings therein leading from above said contact plate means to said processing area, said method comprising directing a displacement liquid into said pressure chamber and onto said contact plate means with said displacement liquid passing through said contact plate opening means to pass into said layer to cause liquid displacement in said layer.

24. The method as recited in claim 23, wherein said displacement liquid is a wash liquid 25. The method as recited in claim 23, wherein said displacement liquid contains a treating agent, and said displacement liquid carries said treating agent into said layer.

26. The method as recited in claim 10, wherein a plurality of slurry portions are moved into said pressure chamber sequentially, with a first of said slurry portions being deposited as a layer on said processing area, having liquid removed therefrom by creating said pressure differential, and then being removed as a layer from said processing area and from said pressure chamber, after which a second slurry portion is moved into said pressure chamber, has liquid removed therefrom and is removed from said chamber, with yet subsequent slurry portions having the above steps repeated, with said above atmospheric pressure being maintained throughout time periods during which each of said slurry portions is in said pressure chamber and also during periods between which said slurry portions are present in said pressure chamber.

27. The method as recited in claim 26, wherein first, second and third portions of a displacement liquid are introduced into said pressure chamber, and sequentially deposited onto said material layer, to displace first, second and third displaced liquid portions from said layer, respectively, said third displaced liquid portion being moved to a collecting area and introduced into said pressure chamber and onto a subsequent layer of material on the processing area during a subsequent sequence of depositing another slurry portion into said pressure chamber and onto said processing area for liquid removal and movement of displacement liquid through said material layer.

28. The method as recited in claim 26, wherein said table assembly with said pressure differential chamber are positioned entirely in said pressure chamber, said removing of said layer from said processing area being accomplish by removal means positioned entirely in said pressure chamber.

29. The method as recited in claim 20, wherein first, second and third portions of a displacement liquid are introduced into said pressure chamber, and sequentially deposited onto said material layer, to displace first, second and third displaced liquid portions from said layer, respectively, said third displaced liquid portion being moved to a collecting area and introduced into said pressure chamber and onto a subsequent layer of material on the processing area during a subsequent sequence of depositing another slurry portion into said pressure chamber and onto said processing area for liquid removal and movement of displacement liquid through said material layer.

30. An apparatus for removing liquid from pulp slurry comprising:

a. a pressure vessel defining a pressure chamber;

b. means to pressurize said pressure chamber to a pressure level above atmospheric pressure;

c. a table assembly which has a perforate support surface means for receiving the pulp slurry thereon, said table assembly being arranged to contain said pulp slurry in a processing area that is located over the support surface means, said support surface means being exposed to pressure in said pressure chamber;

d. infeed means to direct a portion of pulp slurry under pressure into said chamber and onto said surface as a layer, with said layer in said processing area being at a stationary location relative to said support surface;

e. said table assembly defining a pressure differential chamber below said support surface;

f. pressure differential means to create a pressure differential between said pressure differential chamber and said pressure chamber with said pulp slurry on said surface means to cause liquid to flow from said pulp slurry to said pressure differential chamber, and also to reduce said pressure differential;

g. removal means to remove said pulp slurry after liquid removal therefrom and after said pressure differential is reduced;

h. said table assembly, including the pressure differential chamber, being positioned entirely in said pressure chamber.

31. The apparatus as recited in claim 30, wherein said table assembly comprises an upper perforate support plate means, and a lower substantially imperforate plate means, with said upper and lower plate means defining said pressure differential chamber, 32. The apparatus as recited in claim 31, wherein said removal means is arranged to move over said upper perforate support plate means to accomplish a layer removal function.

33. The apparatus as recited in claim 32, wherein said removal means comprises perforate conveyor belt means and power means to move said perforate conveyor belt means.

34. The apparatus as recited in claim 33, further comprising plate support means positioned between said upper perforate plate means and said lower imperforate plate means to withstand compressor loads exerted on said upper and lower plate means urging these toward one another.

35. The apparatus as recited in claim 33, said conveying belt means being positioned entirely within said pressure chamber.

36. An apparatus for removing liquid from pulp slurry comprising:

a. a pressure vessel defining a pressure chamber;

b. means to pressurize said pressure chamber to a pressure level above atmospheric pressure;

c. a table assembly which has a perforate support surface means for receiving the pulp slurry thereon, said table assembly being arranged to contain said pulp slurry in a processing area that is located over the support surface means, said support surface means being exposed to pressure in said pressure chamber;

d. infeed means to direct a portion of pulp slurry under pressure into said chamber and onto said surface as a layer, with said layer in said processing area being at a stationary location relative to said support surface;

e. said table assembly defining a pressure differential chamber below said support surface;

f. pressure differential means to create a pressure differential between said pressure differential chamber and said pressure chamber with said pulp slurry on said surface means to cause liquid to flow from said pulp slurry to said pressure differential chamber, and also to reduce said pressure differential;

g. removal means to remove said pulp slurry after liquid removal therefrom and after said pressure differential is reduced;

h. a contact plate means which is located in said pressure chamber and is moveable from an upper position above said processing area downwardly to a contact position where the contact plate means passes against said pulp slurry to enhance liquid removal.

37. The apparatus as recited in claim 36, wherein said contact plate means has opening means therein leading from above said contact plate means to said processing area, said apparatus further comprising washing liquid input means to direct a washing liquid into said pressure chamber and onto said contact plate means where said washing liquid passes through said contact plate opening means to pass into said layer.

38. The apparatus as recited in claim 37, wherein the contact plate opening means comprises a plurality of contact plate through openings spaced over said contact plate means, said contact plate means having a lower contact surface formed with a plurality of recesses defined by slanted recess walls that slope downwardly and divergently from said contact plate openings.

39. An apparatus for removing liquid from pulp slurry comprising:
   a. a pressure vessel defining a pressure chamber;
   b. means to pressurize said pressure chamber to a pressure level above atmospheric pressure;
   c. a table assembly which has a perforate support surface means for receiving the pulp slurry thereon, said table assembly being arranged to contain said pulp slurry in a processing area that is located over the support surface means, said support surface means being exposed to pressure in said pressure chamber;
   d. infeed means to direct a portion of pulp slurry under pressure into said chamber and onto said surface as a layer, with said layer in said processing area being at a stationary location relative to said support surface;
   e. said table assembly defining a pressure differential chamber below said support surface;
   f. pressure differential means to create a pressure differential between said pressure differential chamber and said pressure chamber with said pulp slurry on said surface means to cause liquid to flow from said pulp slurry to said pressure differential chamber to form a deliquified pulp layer, and also to reduce said pressure differential;
   g. removal means to remove said pulp slurry after liquid removal therefrom and after said pressure differential is reduced;
   h. said removal comprising conveying belt means, and a layer discharge means to remove said layer from said processing area, said layer discharge means comprising a passageway having an inlet to receive said layer from said conveying belt means, said discharge passageway being sized and configured to receive said layer in substantial sealing relationship in said passageway, and leading to a lower pressure location outside of said pressure chamber, said discharge means further comprising control outlet discharge valve means through which said layer is discharged from said lower pressure location.

40. The apparatus as recited in claim 39, wherein said layer discharge means defines a tapering passageway inlet portion which converges in a direction toward the discharge end of said passageway.

41. The apparatus as recited in claim 40, further comprises doctor blade means to enhance removal of said layer from said conveyor belt means and into said passageway.

42. An apparatus for removing liquid from pulp slurry comprising:
   a. a pressure vessel defining a pressure chamber;
   b. means to pressurize said pressure chamber to a pressure level above atmospheric pressure;
   c. a table assembly which has a perforate support surface means for receiving the pulp slurry thereon, and said table assembly is arranged to contain said pulp slurry in a processing area that is located over the support surface means, said support surface means being exposed to pressure in said pressure chamber;
   d. infeed means to direct a portion of pulp slurry under pressure into said chamber and onto said surface as a layer, with said layer in said processing area being at a stationary location relative to said support surface;
   e. said table assembly defining a pressure differential chamber below said support surface;
   f. pressure differential means to create a pressure differential between said pressure differential chamber and said pressure chamber with said pulp slurry on said surface means to cause liquid to flow from said pulp slurry to said pressure differential chamber, and also to reduce said pressure differential;
   g. said processing area being arranged to accomplish both dewatering and washing, and there is additionally washing liquid input means which delivers said washing liquid onto the layer at said processing area; and
   h. said pressure differential means comprising tube means connecting to said pressure differential chamber, equalizing valve means arranged to selectively interconnect said pressure differential chamber with said pressure chamber, pressure reduction valve means connecting said tube means to a lower pressure area to create a lower pressure level in said pressure differential chamber, at least one tube of said tube means being directed to a liquid collecting location, and a recirculating line directing liquid as recirculated liquid from said liquid collecting location back to said pressure vessel where said recirculated liquid can be used as a wash liquid for said layer;
   i. removal means to remove said pulp slurry after liquid removal therefrom and after said pressure differential is reduced.

43. An apparatus adapted to perform a liquid displacement operation either to remove liquid from a material or to move a liquid into said material, said apparatus comprising:
   a. a conveying structure comprising a perforate conveying means having a first high pressure side on which to receive a portion of said material and a second low pressure side, and a conveying support structure for said conveying means;
   b. supply means to supply said material to said conveying structure;
   c. frame enclosure means mounted relative to said conveying means for movement relative to said conveying means between a first engaged position with said conveying means and a second non-engaged position spaced from said conveying means, said frame enclosure means having perimeter wall means defining, in said first position, a containment processing area for said portion of material;
   d. pressure differential means to provide a first greater pressure differential between the high and low pressure sides of the conveying means to effect a displacement of liquid relative to said portion of material at said processing area by causing said liquid to move relative to said portion of material in a direction toward the low pressure side of said conveying means, and to provide a second lesser pressure differential between said high and low pressure sides of the conveying means at the processing area so as to relieve a pressure differential force against said conveying means;
   e. a frame actuating means to cause relative movement between said frame enclosure means and said conveying structure in a manner that with said frame enclosure means being moved to its second position relative to said conveying structure, said conveying means is able to move said portion of material from said processing area;
   f. a pressure vessel in which said conveying structure and said frame enclosure means are contained, said pressure vessel being structured and arranged to be pressurized to a pressure to apply pressure to the high pressure side of the conveying means.

44. The apparatus as recited in claim 43, wherein said conveying support structure comprises an upper perforate support plate means for said conveying means, and a lower imperforate plate means, with said upper and lower plate means defining a low pressure chamber, said pressure differential means being arranged to modify a pressure differential between said low pressure chamber and pressure within said vessel.

45. The apparatus as recited in claim 44, wherein said conveying support structure comprises conduit means connecting to said low pressure chamber so as to be able to selectively apply low pressure to said low pressure chamber to apply said pressure differential.

46. The apparatus as recited in claim 45, wherein said conduit means comprises laterally spaced beam members supporting said first and second plate means, at least one of said beam members defining said conduit connecting to said low pressure chamber.

47. The apparatus as recited in claim 43, wherein said conveying support structure comprises laterally space beam members, at least one of which defines a conduit, an upper perforate plate means extending between and supported by said beam members, and a lower imperforate plate means extending between and supported by said beam members, said upper and lower plate means defining a low pressure chamber which communicates with the conduit.

48. The apparatus as recited in claim 47, wherein said pressure vessel encloses said conveying structure and said frame enclosure means, with pressure in said vessel providing pressure above said upper plate means and below said lower plate means to urge said upper and lower plate means toward one another.

49. The apparatus as recited in claim 48, further comprising upper and lower plate support means to withstand compression loads exerted on said upper and lower plate means urging these toward one another.

50. The apparatus as recited in claim 49, wherein said conveying means comprises an endless foraminous belt which travels between said laterally spaced beam members.

51. The apparatus as recited in claim 43, wherein said apparatus has two processing areas, namely a first dewatering area and a second washing area, said frame enclosure means comprising a first mat forming enclosing section and a second washing enclosure section, said mat forming enclosure section defining said dewatering area, and said second washing enclosure section defining said washing area, said conveying means being arranged to carry a material mat being formed at said dewatering section to said washing section said apparatus comprising a wash liquid supply means.

52. The apparatus as recited in claim 51, wherein said conveying means is an endless conveyor, and said frame enclosure means is arranged to be moved downwardly onto said endless conveyor to provide an enclosed dewatering area and an enclosed washing area, and there is material supply means which deposits a portion of a liquid bearing material in the dewatering area, said apparatus further comprising wash liquid supply means to deposit liquid onto said washing area.

53. The apparatus as recited in claim 43, wherein said conveying means comprises an endless belt means said pressure differential means comprising low pressure chamber defining means defining a low pressure chamber and comprising an upper perforate plate supporting said belt means and lower plate means, said low pressure chamber means being arranged so that pressure in said vessel is exerted on said perforate plate means and said lower plate means.

54. The apparatus as recited in claim 43, wherein said supply means is structured and arranged to deposit said portion of material on said high pressure side as a liquid containing material, with said pressure differential means causing a liquid removal operation as liquid flows from said material.

55. The apparatus as recited in claim 43, further comprising a wash liquid supply means to supply wash liquid onto said portion of material to cause displacement of said wash liquid into said portion of material as part of a washing operation.

56. The apparatus as recited in claim 43, further comprising a treatment liquid supply means adapted to supply a treatment liquid onto said portion of material, so that there is movement of said treatment liquid into said portion of material.

57. A method to perform a liquid displacement operation either to remove liquid from a material or to move a fluid into said material, said method comprising:

a. providing a conveying structure comprising a perforate conveying means having a first high pressure side and a second low pressure side, and supporting said conveying means by a conveying support structure, said conveying means being enclosed in a pressure vessel;

b. pressurizing said pressure vessel;

c. positioning frame enclosure means that is located in said pressure vessel at a first engaged position with said conveying means with said frame enclosure means having perimeter wall means defining, in said first position, a processing area, and depositing a portion of said material on the high pressure side of said conveying means in said processing area;

d. applying a pressure differential between the high and low pressure sides of the conveying means to effect a displacement relative to said portion of material at said processing area by causing said liquid to move relative to said portion of material in a direction toward the low pressure side of said conveying means;

e. then reducing said pressure differential between said high and low pressure sides of the conveying means at the processing area so as to relieve a pressure differential force against said conveying means;

f. moving said frame enclosure means relative to said conveying structure in a manner that with said frame enclosure means moved to a second position relative to said conveying structure, so as to be spaced from said conveying means, said conveying means moves said portion of material from said processing area.

58. The method as recited in claim 57, wherein said portion of material is liquid bearing material, and said pressure differential is applied to remove liquid from said material with said liquid being moved through said conveying means.

59. The method as recited in claim 57, wherein said portion of material is a material to be washed, and a washing liquid is deposited on said material, said pressure differential being applied to move said washing liquid into said portion of material to displace matter presently in said material.

60. The method as recited in claim 57, wherein said portion of material is on said conveying means for treatment, and a treatment liquid is deposited on said portion of material, said pressure differential acting to move said treatment liquid into said portion of material.

61. The method as recited in claim 57, said method further comprising providing a low pressure chamber defining structure below said conveying means, with a perforate plate means of said low pressure chamber defining structure supporting said conveying means, with said pressure differential being applied to press said material on said conveying means and against said perforate plate means.

62. An apparatus for performing liquid removal from a liquid bearing material comprising:
   a. a pressure vessel having a processing area;
   b. means for delivering a portion of said material into said vessel to said processing area for liquid removal;
   c. means to selectively provide a pressure differential across said portion at said processing area to remove liquid therefrom;
   d. means for discharging such removed liquid from said vessel;
   e. means to selectively reduce said pressure differential at said processing area;
   f. means for moving said portion of material from said processing area when said pressure differential has been reduced;
   g. means for removing said portion of material from said vessel after being moved from said processing area;
   h. said apparatus further comprising containment means positioned within said vessel to contain said material in said processing area, said containment means comprising an enclosure frame means extending around said processing area to contain said pulp slurry in said processing area, and at least a section of said enclosure frame means is moveable between a first position enclosing said processing area, and a second position where at least said section of said enclosure frame means is spaced from said processing area, said apparatus further comprising a frame actuating means to move at least said frame section between said first and second position.

63. An apparatus for performing liquid removal from a liquid bearing material comprising:
   a. a pressure vessel having a processing area;
   b. means for delivering a portion of said material into said vessel to said processing area for liquid removal;
   c. means to selectively provide a pressure differential across said portion at said processing area to remove liquid therefrom;
   d. means for discharging such removed liquid from said vessel;
   e. means to selectively reduce said pressure differential at said processing area;
   f. means for moving said portion of material from said processing area when said pressure differential has been reduced;
   g. means for removing said portion of material from said vessel after being moved from said processing area;
   h. said apparatus having two processing area portions in said pressure vessel, namely a first dewatering area and a second washing area, said apparatus further comprising frame enclosure means comprising a first mat forming enclosure section and a second washing enclosure section, said mat forming enclosure section defining said dewatering area, and said second enclosure section defining said washing area;
   i. said apparatus also comprising a wash liquid supply means.

64. An apparatus for removing liquid from a material or to move a liquid into said material, said apparatus comprising:
   a. a pressure vessel defining a pressure chamber;
   b. means to pressurize said pressure chamber to a chamber pressure level;
   c. a table assembly which is positioned entirely within said vessel has a perforate support surface means for receiving the material thereon, said table assembly being arranged to contain said material in a processing area that is located over the support surface means, said support surface means being exposed to pressure in said pressure chamber;
   d. infeed means to direct a portion of said material under pressure into said chamber and onto said surface means;
   e. said table assembly defining a pressure differential chamber below said support surface;
   f. pressure differential means to create a pressure differential between said pressure differential chamber and said pressure chamber with said material on said surface means, and also to reduce said pressure differential;
   g. removal means to remove said material from said processing area after said pressure differential is reduced, and out of said pressure chamber;
   h. said pressure chamber extending both above and below said table assembly, and being arranged to remain pressurized when said material is removed from the pressure chamber.

65. The apparatus as recited in claim 64, wherein said table assembly comprises a table unit that has an upper perforate plate defining said support surface and having opening means therein, and a lower plate means defining said pressure different chamber.

66. The apparatus as recited in claim 64, wherein said removal means comprises a conveying belt means extending beneath said processing area and comprising upper, lower, and end belt portions, all of which are positioned entirely within said pressure chamber.

67. The apparatus as recited in claim 64, wherein said pressure differential means comprises tube means connecting to said pressure differential chamber, valve means arranged to selectively interconnect said pressure differential chamber with said pressure chamber, and to connect said tube means to a lower pressure area to create a lower pressure level in said pressure differential chamber.

68. The apparatus as recited in claim 67, wherein at least one tube of said tube means is directed to a liquid collecting location, said apparatus further comprising a recirculating line directing liquid as recirculated liquid from said liquid collecting location back to said pressure vessel where said recirculated liquid can be used as a wash liquid for said layer.

69. An apparatus for removing liquid from a material or to move a liquid into said material, said apparatus comprising:
   a. a pressure vessel defining a pressure chamber;
   b. means to pressurize said pressure chamber to a chamber pressure level;
   c. a table assembly which is positioned within said vessel, has a perforate support surface means for receiving the material thereon, and said table assembly is arranged to contain said material in a processing area that is located over the support surface means, said support surface means being exposed to pressure in said pressure chamber;

d. infeed means to direct a portion of said material under pressure into said chamber and onto said surface means;

e. said table assembly defining a pressure differential chamber below said support surface;

f. pressure differential means to create a pressure differential between said pressure differential chamber and said pressure chamber with said material on said surface means, and also to reduce said pressure differential;

g. removal means to remove said material after said pressure differential is reduced;

h. said apparatus further comprising containment means to contain said material in said processing area, said containment means comprising an enclosure frame means extending around said processing area to contain said material in said processing area, and at least a section of said enclosure frame means is moveable between a first position adjacent to said perforate support surface means so as to contain said material, and a second position where at least said section of said enclosure frame means is spaced from said support surface means, said assembly further comprising a frame actuating means to move at least said frame section between said first and second position.

70. An apparatus for removing liquid from a liquid bearing material, comprising:

a. a pressure vessel defining a pressure chamber;

b. means to pressurize said pressure chamber to a pressure level above atmospheric pressure;

c. a table assembly which has a perforate support surface means for receiving the liquid bearing material thereon in a processing area that is located over the support surface means, said support surface means being exposed to pressure in said pressure chamber;

d. infeed means to direct a portion of said liquid bearing material under pressure into said chamber and onto said support surface means as a layer;

e. pressure differential means to create a pressure differential across said material on said support surface means to cause liquid to flow from said material;

f. a contact plate means which is located in said pressure chamber and is moveable from an upper position above said processing area downwardly to a contact position where the contact plate means presses against said liquid bearing material to enhance liquid removal.

71. The apparatus as recited in claim 70, wherein said contact plate means has opening means therein leadings from above said contact plate means to said processing area, said apparatus further comprising means to direct displacement liquid into said pressure chamber and onto said contact plate means where said displacement liquid passes through said contact plate opening means to pass into said layer.

72. The apparatus as recited in claim 71, wherein the contact plate opening means comprises a plurality of contact plate through openings spaced over said contact plate means, said contact plate means having a lower contact surface formed with a plurality of recesses defined by slanted recess walls that slope downwardly and divergently from said contact plate openings.

73. An apparatus for removing liquid from a liquid bearing material, comprising:

a. a pressure vessel defining a pressure chamber;

b. means to pressurize said pressure chamber to a pressure level above atmospheric pressure;

c. a table assembly which has a perforate support surface means for receiving the liquid bearing material thereon, in a processing area that is located over the support surface means, said support surface means being exposed to pressure in said pressure chamber;

d. infeed means to direct a portion of said liquid bearing material under pressure into said chamber and onto said surface as a layer;

e. pressure differential means to create a pressure differential across said material on said surface means to cause liquid to flow from said pulp slurry;

g. removal means to remove said pulp slurry after liquid removal therefrom while said pressure chamber is pressurized to a level above atmospheric pressure, said removal means comprising a conveying means and means defining a discharge passageway having an inlet to receive said material from said conveying means, said discharge passageway being sized and configured to receive said layer in substantial sealing relationship in said passageway, and leading to a lower pressure location outside of said pressure chamber, said removal means further comprising control outlet discharge valve means through which said material is discharged from said lower pressure location.

74. The apparatus as recited in claim 73, wherein said material after liquid removal is formed as a mat, and said inlet comprises an entry portion defining an elongate passageway opening corresponding in size and configuration to said mat which with said mat substantially blocking said passageway to inhibit pressure loss through said passageway.

75. The apparatus as recited in claim 74, wherein said entry portion is a tapering passageway inlet portion which converges in a direction toward the discharge end of said passageway.

76. The apparatus as recited in claim 75, wherein conveying means comprises a perforate conveyor belt means which is moved to direct said mat into said passageway for removal of said mat from said pressure chamber.

77. The apparatus as recited in claim 76, further comprises doctor blade means to enhance removal of said mat from said conveyor belt means and into said passageway.

78. An apparatus for performing liquid removal from a liquid bearing material and subsequent liquid displacement through said material, said apparatus comprising:

a. a pressure vessel having a processing area;

b. means for delivering a portion of said material into said vessel to said processing area for liquid removal;

c. means to selectively provide a pressure differential across said portion at said processing area to remove liquid therefrom and form a deliquified layer of material;

d. means for discharging such removed liquid from said vessel;

e. means for delivering a portion of a displacement liquid into said vessel and onto said deliquified material, with said means to provide a pressure differential causing said displacement liquid to move into said layer of material and displace liquid therefrom;

f. means to selectively reduce said pressure differential at said processing area;

g. means for moving said portion of material from said processing area when said pressure differential has been reduced;

h. means for removing said portion of material from said vessel after being moved from said processing area;

i. said apparatus being structured and arranged so that said vessel is pressurized above atmospheric pressure when said portion of material is delivered into said vessel, when said pressure differential exists, when said displacement liquid is delivered into said vessel, when said pressure differential is reduced, and when said portion of material is removed from said vessel after removal of liquid and displacement of liquid.

79. The apparatus as recited in claim 78, wherein said apparatus is arranged to deliver at least first, second and third portions of said displacement liquid into said vessel and onto said deliquified material, said apparatus also having first, second and third collecting means to receive first, second and third portions of displaced liquid resulting from displacement by said first, second and third portions of displacement liquid, respectively, said apparatus further having displacement liquid transfer means to transfer the third liquid portions displaced by said second placement liquid to said means for delivering displacement liquid to be introduced into said pressure vessel as said second portion of displacement liquid during a subsequent cycle of having liquid bearing material introduced into said pressure vessel.

80. The apparatus as recited in claim 79, where there is a fourth collecting location to collect liquid displaced from said deliquified material layer by a fourth displacement liquid portion, and there is a further displacement liquid transfer means to collect the fourth liquid portion displaced from said material layer and deliver said fourth displaced liquid portions to said deliver said liquid from said fourth collecting location into said vessel and onto said layer of material as the third displacement liquid for a subsequent liquid removal and liquid displacement operation in said vessel.

81. A method to accomplish liquid removal from a liquid bearing material and liquid displacement in said material, said method comprising:

a. moving the material into an above atmospheric pressure chamber in a manner to form said slurry as a layer at a processing area over a foraminous support surface means of a table assembly positioned in said pressure chamber;

b. creating a lower pressure level, relative to the pressure level in said pressure chamber, in a pressure differential chamber provided in said table assembly, with said pressure differential chamber extending beneath said processing area, to create a pressure differential with said layer being stationary at said processing area to cause said liquid removal from said layer;

c. introducing a portion of displacement liquid into said pressure chamber while maintaining above atmospheric pressure in said pressure chamber, with said pressure differential causing said displacement liquid to move into said layer to displace liquid then in said layer;

d. creating a higher pressure level in said pressure differential chamber relative to the pressure level in said pressure chamber to reduce said pressure differential;

e. removing said material from said chamber, while maintaining above atmospheric pressure in said chamber.

82. The method as recited in claim 81, further comprising introducing a second portion of displacement liquid into said pressure chamber and onto said layer of material, with said pressure differential causing said second portion of displacement liquid to cause displacement of said prior displacement liquid from said layer.

83. The method as recited in claim 82, wherein third and fourth portions of displacement liquid are introduced into said pressure chamber while maintaining above atmospheric pressure in said pressure chamber, with said pressure differential causing said third and fourth portions of displacement liquid to displace said portions of liquid from said layer, said method further comprising directing two portions of liquid displaced by said third and fourth displacement liquid portions to collecting locations and utilizing these portions of displaced liquid as the second and third displacement liquid portions in a subsequent process of said liquid removal and liquid displacement.

84. The method as recited in claim 83, wherein said liquid bearing material is a pulp slurry, and said displacement liquid is a washing liquid.

85. The method as recited in claim 82, wherein said liquid bearing material is a pulp slurry, and said displacement liquid is a washing liquid.

86. The method as recited in claim 81, wherein at least some of said displacement liquid contains a treating agent which acts on said material layer.

87. The method as recited in claim 86, wherein said material is a wood pulp slurry, and said treating agent is a wood pulp treating agent.

88. An apparatus for performing liquid removal from a liquid bearing material comprising:

a pressure vessel having a processing area;

means for pressurizing said vessel above atmospheric pressure;

means for delivering a portion of said material into said vessel to said processing area for liquid removal, while said vessel is above atmospheric pressure;

means to selectively provide a pressure differential across said portion at said processing area to remove liquid therefrom, while maintaining said vessel pressurized above atmospheric pressure;

means for discharging such removed liquid from said vessel while maintaining said vessel pressurized above atmospheric pressure;

means to selectively reduce said pressure differential at said processing area while maintaining said vessel pressurized above atmospheric pressure;

means for moving said portion of material from said processing area to another location in said vessel when said pressure differential has been reduced, and while maintaining said vessel above atmospheric pressure;

means for removing said portion of material from said vessel after being moved to said another location, while maintaining said vessel above atmospheric pressure;

said means to selectively provide a pressure differential comprising a table assembly positioned entirely with said pressure vessel and defining a pressure differential chamber in said table assembly;

said means to selectively .provide said pressure differential further comprising means to open said pressure differential chamber to a pressurized chamber in said pressure vessel, and said means to reduce said pressure differential comprises means to open said pressure differential chamber to a lower pressure area outside of said pressure vessel.

89. The apparatus as recited in claim 88, wherein said moving said portion of material from said processing area comprises a conveyor belt means extending over said processing area.

90. The method as recited in claim 89, wherein said conveyor belt means is positioned entirely within said pressure vessel 91. The apparatus as recited in claim 88, wherein there is a contact plate means which is located in said pressure chamber and is moveable from an upper position above said processing area downwardly to a contact position where the contact plate means presses against said pulp slurry to enhance liquid removal.

92. The apparatus as recited in claim 91, wherein said contact plate means has opening means therein leading from above said contact plate means to said processing area, said apparatus further comprising displacement liquid input means to direct a displacement liquid into said pressure vessel and onto said contact plate means where said displacement liquid passes through contact plate opening means to pass into said layer.

93. The apparatus as recited in claim 92, wherein the contact plate opening means comprises a plurality of contact plate through opens spaced over said contact plate means, said contact plate means having a lower contact surface formed with a plurality of recesses defined by slanted recess walls that slope downwardly and divergently from said contact plate openings.

94. The apparatus as recited in claim 93, wherein the contact plate opening means comprises a plurality of contact plate through openings spaced over said contact plate means, said contact plate means having a lower contact surface formed with a plurality of recesses defined by slanted recess walls that slope downwardly and divergently from said contact plate openings.

95. The apparatus as recited in claim 88, wherein said means for removing said portion of material from said vessel comprises means defining a passageway having an inlet to receive said material, said passageway being sized and converted to receive said material in substantial sealing relationship in said passageway, and leading to a lower pressure location outside of said pressure vessel, control outlet discharge valve means through which said material is discharged outside said vessel.

96. A method for performing liquid removal from a liquid bearing material comprising:

delivering a portion of said material into a pressure chamber to a processing area therein while said chamber is pressurized above atmospheric pressure;

providing a pressure differential across said portion at said processing area to remove liquid therefrom while maintaining said chamber pressurized above atmospheric pressure;

discharging such removed liquid from said chamber while maintaining said vessel pressurized above atmospheric pressure;

reducing said pressure differential at said processing area while maintaining said chamber above atmospheric pressure;

moving said portion from said processing area, when said pressure differential has been reduced, to a location outside of said chamber, while maintaining said chamber above atmospheric pressure;

said pressure differential being provided by creating a lower pressure level, relative to the pressure level in said pressure chamber, in a pressure differential chamber provided in a table assembly positioned in said pressure chamber, while maintaining pressure in said pressure chamber above atmospheric pressure and said pressure differential being reduced by creating a higher pressure level above atmospheric pressure in said pressure differential chamber relative to the pressure level in said pressure chamber, while maintaining pressure in said pressure chamber above atmospheric pressure.

97. The method as recited in claim 96, wherein said pressure differential is reduced by raising pressure in said pressure differential to a level substantially equal to the above atmospheric pressure in said pressure chamber.

98. The method as recited in claim 96, further comprising defining said processing area by positioning an enclosure frame means on a foraminous support surface means at said processing area, and moving said liquid bearing material into said enclosure frame means.

99. The method as recited in claim 98, further comprising removing said material from said processing area by means of a conveyor belt means which provides said foraminous support surface and on which said material is delivered.

100. The method as recited in claim 96, further comprising positioning a contact plate means on to said liquid material at the processing area and causing said plate means to press downwardly on said material to enhance liquid removal.

101. The method as recited in claim 100, wherein said contact plate means has openings therein leading from above said contact plate means to said processing area, said method comprising directing displacement liquid into said pressure chamber and onto said contact plate means with said displacement liquid passing through said contact plate opening means to pass into said layer to cause liquid displacement in said layer.

102. An apparatus for performing liquid removal from a liquid bearing material comprising:

a pressure vessel having a processing area;

means for pressurizing said vessel above atmospheric pressure;

means for delivering a portion of said material into said vessel to said processing area for liquid removal, while said vessel is above atmospheric pressure;

means to selectively provide a pressure differential across said portion at said processing area to remove liquid therefrom, while maintaining said vessel pressurized above atmospheric pressure means for discharging such removed liquid from said vessel while maintaining said vessel pressurized above atmospheric pressure;

means to selectively reduce said pressure differential at said processing area while maintaining said vessel pressurized above atmospheric pressure;

means for moving said portion of material from said processing area to another location in said vessel when said pressure differential has been reduced, and while maintaining said vessel above atmospheric pressure;

means for removing said portion of material from said vessel after being to said another location, while maintaining said vessel above atmospheric pressure;

contact plate means which is located in said pressure chamber and is moveable from an upper position above said processing area downwardly to a contact position where the contact plate means presses against said pulp slurry to enhance liquid removal.

103. An apparatus for performing liquid removal from a liquid bearing material comprising:

a pressure vessel having a processing area;

means for pressurizing said vessel above atmospheric pressure;

means for delivering a portion of said material into said vessel to said processing area for liquid removal, while said vessel is above atmospheric pressure;

means to selectively provide a pressure differential across said portion at said processing area to remove liquid therefrom, while maintaining said vessel pressurized above atmospheric pressure;

means for discharging such removed liquid from said vessel while maintaining said vessel pressurized above atmospheric pressure;

means to selectively reduce said pressure differential at said processing area while maintaining said vessel pressurized above atmospheric pressure;

means for moving said portion of material from said processing area to another location in said vessel when said pressure differential has been reduced, and while maintaining said vessel above atmospheric pressure;

means for removing said portion of material from said vessel after being moved to said another location, while maintaining said vessel above atmospheric pressure;

said means for removing said portion of material from said vessel comprising means defining a passageway having an inlet to receive said material, said passageway being sized and converted to receive said material in substantial sealing relationship in said passageway, and leading to a lower pressure location outside of said pressure vessel, control outlet discharge valve means through which said material is discharged outside said vessel.

* * * * *